(12) United States Patent
Liu et al.

(10) Patent No.: US 10,965,334 B2
(45) Date of Patent: Mar. 30, 2021

(54) SAR RADIATION-FREE MOBILE TERMINAL BODY, SAR RADIATION-FREE EXTERNAL COMMUNICATION BODY AND SAR RADIATION-FREE MOBILE TERMINAL

(71) Applicants: Tianjin Huanuo Communication Engineering Co., Ltd., Tianjin (CN); Jiliang Han, Tianjin (CN); Yueyan Liu, Tianjin (CN)

(72) Inventors: Yueyan Liu, Tianjin (CN); Jiliang Han, Tianjin (CN)

(73) Assignees: Tianjin Huanuo Communication Engineering Co., Ltd., Tianjin (CN); Jiliang Han, Tianjin (CN); Yueyan Liu, Tianjin (CN)

( * ) Notice: Subject to any disclaimer, the term of this patent is extended or adjusted under 35 U.S.C. 154(b) by 211 days.

(21) Appl. No.: 16/212,628

(22) Filed: Dec. 6, 2018

(65) Prior Publication Data
US 2020/0076463 A1  Mar. 5, 2020

(30) Foreign Application Priority Data
Sep. 5, 2018 (CN) .......................... 201811032203.3

(51) Int. Cl.
*H04B 1/3827* (2015.01)
*H01Q 1/24* (2006.01)
(Continued)

(52) U.S. Cl.
CPC .......... *H04B 1/3838* (2013.01); *H01Q 1/243* (2013.01); *H04B 10/25* (2013.01); *H04B 10/40* (2013.01);
(Continued)

(58) Field of Classification Search
CPC ...... H04B 1/3838; H04B 10/25; H04B 10/40; H04B 10/66; H01Q 1/243; H04W 52/0209
See application file for complete search history.

(56) References Cited

U.S. PATENT DOCUMENTS

| 2002/0086715 | A1 | 7/2002 | Sahagen | |
| 2009/0231231 | A1* | 9/2009 | Norman | H01Q 1/245 343/883 |
| 2015/0215046 | A1* | 7/2015 | Mekis | G02B 6/4213 398/200 |

FOREIGN PATENT DOCUMENTS

| CN | 2479692 | 2/2002 |
| CN | 102204109 | 9/2011 |

(Continued)

OTHER PUBLICATIONS

"International Search Report (Form PCT/ISA/210) of PCT/CN2018/125965 ," dated Mar. 7, 2019, with English translation thereof, pp. 1-6.

(Continued)

*Primary Examiner* — Mina M Shalaby
(74) *Attorney, Agent, or Firm* — JCIPRNET

(57) ABSTRACT

The present invention discloses a SAR radiation-free mobile terminal body, a SAR radiation-free external communication body and a SAR radiation-free mobile terminal. The SAR radiation-free mobile terminal comprises the SAR radiation-free mobile terminal body. The SAR radiation-free external communication body is disposed outside the SAR radiation-free mobile terminal body and is connected with the SAR radiation-free mobile terminal body through optical fibers. The SAR radiation-free external communication body comprises a communication module connecting with a communication base station without affecting the compatibility and normal radiation power of communication equipment; inter- (Continued)

conversion between electric signals and optical signals is realized through a photoelectric conversion module. Signals are transmitted between the SAR radiation-free external communication body and the SAR radiation-free mobile terminal body through optical fibers mainly made from non-metallic materials, so that conduction of microwave radiation is avoided, thus, effectively avoiding the harm of mobile phone radiation to human bodies.

9 Claims, 12 Drawing Sheets

(51) Int. Cl.
*H04B 10/25* (2013.01)
*H04B 10/40* (2013.01)
*H04B 10/66* (2013.01)
*H04W 52/02* (2009.01)

(52) U.S. Cl.
CPC ........ *H04B 10/66* (2013.01); *H04W 52/0209* (2013.01)

(56) References Cited

FOREIGN PATENT DOCUMENTS

| | | | |
|---|---|---|---|
| CN | 202841112 | | 3/2013 |
| CN | 202998180 | U * | 6/2013 |
| CN | 106131310 | | 11/2016 |

OTHER PUBLICATIONS

"Written Opinion of the International Searching Authority (Form PCT/ISA/237) of PCT/CN2018/125965," dated Mar. 7, 2019, with English translation thereof, pp. 1-7.

* cited by examiner

SAR RADIATION-FREE MOBILE TERMINAL BODY, SAR RADIATION-FREE EXTERNAL COMMUNICATION BODY AND SAR RADIATION-FREE MOBILE TERMINAL

CROSS-REFERENCE TO RELATED APPLICATION

This application claims the priority benefit of China application serial no. 201811032203.3, filed on Sep. 5, 2018. The entirety of the above-mentioned patent application is hereby incorporated by reference herein and made a part of this specification.

BACKGROUND OF THE INVENTION

Technical Field

The present invention belongs to the technical field of mobile communications, and particularly relates to a SAR radiation-free mobile terminal body, a SAR radiation-free external communication body and a SAR radiation-free mobile terminal.

Description of Related Art

Mobile phones (GSM and CDMA) have greatly facilitated communications ever since they were developed. With the appearance of 5G, 6G and 7G, the frequency is becoming higher and higher, the data flow is becoming greater and greater, and mobile video has become the mainstream.

SAR (Specific Absorption Rate) is internationally used as the standard to evaluate the electromagnetic radiation of mobile phones. The SAR standard value adopted by Institute of Electrical and Electronic Engineers (IEEE), USA and Korea is 1.6 W/kg (CDMA), the SAR standard value adopted by European Union is 2.0 W/kg (GSM), the SAR standard value adopted by China is 2.0 W/kg, and all nations believe that it will be safe as long as the radiation to heads is smaller than 2.0 W/kg. The International Commission on Non-Ionizing Radiation Protection (ICNIRP) has set a radiation standard equal to or smaller than 2.0 W/kg (6 seconds).

Electromagnetic radiation pollution (also called radio-frequency radiation pollution) of mobile terminal devices such as mobile phones, smart watches and computers, the pollution of electromagnetic waves spatially generated by alternating currents to the outside such as bidirectional wireless electromagnetic wave (microwave) communications between mobile phones and communication base stations, and the heat effect caused by microwave radiation of mobile phones may do harm to human bodies. For instance, when people listen to music or watch videos with earphones in daily life, audio information or other information is transmitted to the ears in the form of electric signals through the earphones, and electromagnetic radiation is generated in this process and may do harm to people.

In 2011, the World Health Organization (WHO) has listed mobile phone radiation as one of the cancerogens which may cause cancers to humans. On Mar. 28, 2018, the National Toxicology Program (NTP) attached to United States Department of Health and Human Services has drawn a conclusion that severe mobile phone radiation may cause cerebral cancers and adrenal gland cancers. Cerebral cancers on the right side of the brain are closely related to phone listening with right ears. Radiation exposure will be sharply increased by 5G network deployment in the future.

If callers use mobile phones for a long time, the face of the callers may have a sense of burning heat, the ears of the callers may have a sense of pain, in this case, the microwave frequency is about over 850 MHZ-60 GHZ, electromagnetic waves penetrate into the head by a depth of about 3-5 mm, and the radiation of the electromagnetic waves to brains and ears may do harm to human bodies.

Mobile phones, intercoms and tablet computers directly face the heads of human bodies, microwaves of the mobile phones are transmitted to the heads of human bodies via metal wires of wired earphones/microphones, and the radiation of these microwaves to the heads of human bodies may also do harm to human bodies.

Mobile phone antennas need to have a clearance zone in which any metal, which may disturb or even block signals, should be avoided nearby to realize omnidirectional transmission of antenna signals. Due to the fact that a whole surface of full-screen phones is completely covered by a metal screen, antenna design requirements for these full-screen phones are very high. 5G, 6G and 7G phones have even higher requirements for the antenna clearance zone, mobile phone manufacturers will automatically switch the phones to a 4G network in scenes where signals are likely to be blocked in communications, the phones are connected to a 5G network only when normally held by users, and metal shells cannot be adopted.

Nowadays, the following several techniques are adopted worldwide to prevent mobile phone radiation. A hearing-aid hollow guide tube method that a hollow plastic guide tube connected with mobile phones is placed on ears and guides sounds from the mobile phones into the ears, which is based on the principle of the stethoscope. But due to the fact that sound transmission by stethoscopes has obvious side effects, this method is not applied or popularized. A reflection shielding method is designed in a manner that a layer of metal foil or a metal reflector is covered with a thin resin flake, but this method is inapplicable to 5G mobile phones. Radiation shields can be adopted, but the radiation shields may disturb mobile phones and consequentially cause more radiation. Out-playing through mobile phone speakers is the best radiation protection technology accepted by WHO, but this method has the limitations of poor speech security, poor effect in noisy environments and the like.

BRIEF SUMMARY OF THE INVENTION

The object of the present invention is to provide a SAR radiation-free mobile terminal to solve the above-mentioned technical problems and to eliminate harmful potential threats of electromagnetic radiation from mobile terminals, such as mobile phones, intercoms, tablet computers and laptop computers to the head and ears of human body. The present invention also provides a technical solution of a mobile terminal body, which has electromagnetic radiation greatly decreased to about 0 mW/kg without affecting normal transmission between mobile terminals (such as mobile phones) and communication base stations and normal contact or interaction between the mobile terminals and human bodies, thus, eliminating the harm of mobile phone electromagnetic radiation to human bodies.

The present invention provides a SAR radiation-free mobile terminal body. The SAR radiation-free mobile terminal body comprises a main processor; a first photoelectric conversion module being connected with the main processor and used to convert communication electric signals from the main process into communication optical signals or to convert optical signals from a SAR radiation-free external communication body into electric signals capable of being received by the main processor; a first optical transceiver connected with the first photoelectric conversion module and used to receive or transmit the optical signals; and a first optical fiber interface having one end connected with the first optical transceiver.

Preferably, the SAR radiation-free mobile terminal body further comprises a first switching module and an internal work module, wherein the internal work module comprises an internal low-frequency work module and/or an internal intermediate-frequency work module and/or an internal high-frequency work module, wherein the internal low-frequency work module and/or the internal intermediate-frequency work module and/or the internal high-frequency work module are/is disposed inside the SAR radiation-free mobile terminal body, the internal low-frequency work module and/or the internal intermediate-frequency work module and/or the internal high-frequency work module, wherein one end of the first switching module electrically connects with the internal low-frequency work module and/or the internal intermediate-frequency work module and/or the internal high-frequency work module and the first photoelectric conversion module, and the other end of the first switching module electrically connects with the main processor.

Preferably, the SAR radiation-free mobile terminal body is applied to mobile phones, intercoms, tablet computers, computers, earphones, bone-conduction earphones, Bluetooth earphones, Bluetooth speakers, or smart watches with a Bluetooth function.

The invention further provides a SAR radiation-free external communication body based on the SAR radiation-free mobile terminal body. The SAR radiation-free external communication body comprises: a communication module, wherein the communication module comprises an external high-frequency work module connected with a communication base station, and electric signals are bidirectionally transmitted between the external high-frequency work module and the communication base station; a second photoelectric conversion module, wherein the second photoelectric conversion module is electrically connected with the communication module and is used to convert electric signals transmitted from the communication module into optical signals to be sent to the SAR radiation-free mobile terminal body or to convert optical signals from the SAR radiation mobile terminal body into electric signals capable of being received by the communication module; a second optical transceiver, wherein the second optical transceiver is connected with the second photoelectric conversion module and is used to receive or transmit the optical signals; and a second optical fiber interface, wherein one end of the second optical fiber interface is connected with the second optical transceiver, and the other end of the second optical fiber interface is connected with one end of an optical fiber, and the other end of the optical fiber is connected with the other end of the first optical fiber interface.

Preferably, the communication module further comprises a Bluetooth module and/or audio module, wherein the Bluetooth module and/or audio module and the external high-frequency work module are electrically connected with a second switching module.

Preferably, the SAR radiation-free external communication body is provided with a second power source, wherein the second power source is connected with the communication module, the second photoelectric conversion module, the second optical transceiver and the second optical fiber interface and supplies power to the communication module, the second photoelectric conversion module, the second optical transceiver and the second optical fiber interface.

Preferably, the communication module communicates with the communication base station wirelessly or through WIFI.

Preferably, the SAR radiation-free external communication body is applied to computer network cards, radio-frequency cards, mobile phones, computers or smart watches.

The present invention further provides a SAR radiation-free mobile terminal based on the SAR-free external communication body. The SAR radiation-free mobile terminal comprises the SAR radiation-free mobile terminal body and the SAR radiation-free external communication body, wherein the SAR radiation-free external communication body is disposed outside the SAR radiation-free mobile terminal body, and the SAR radiation-free mobile terminal body, wherein the SAR radiation-free external communication body connects with the SAR radiation-free mobile terminal body through an optical fiber.

Preferably, the optical fiber has a length equal to or more than 0.3 m.

The present invention has the following advantages and beneficial effects: the SAR radiation-free external communication body is provided with the communication module capable of being connected with the communication base station without affecting the compatibility and normal radiation power of communication equipment. Inter-conversion between electric signals and optical signals is realized through a photoelectric conversion circuit. Signals are transmitted between the SAR radiation-free external communication body and the SAR radiation-free mobile terminal body through optical fibers. The optical fibers are mainly made of non-metallic materials, such as glass, plastic and nylon, so that conduction of microwave radiation is avoided, thus, effectively avoiding the harm of mobile phone radiation to human bodies.

DETAILED DESCRIPTION OF THE INVENTION

Figure 1:
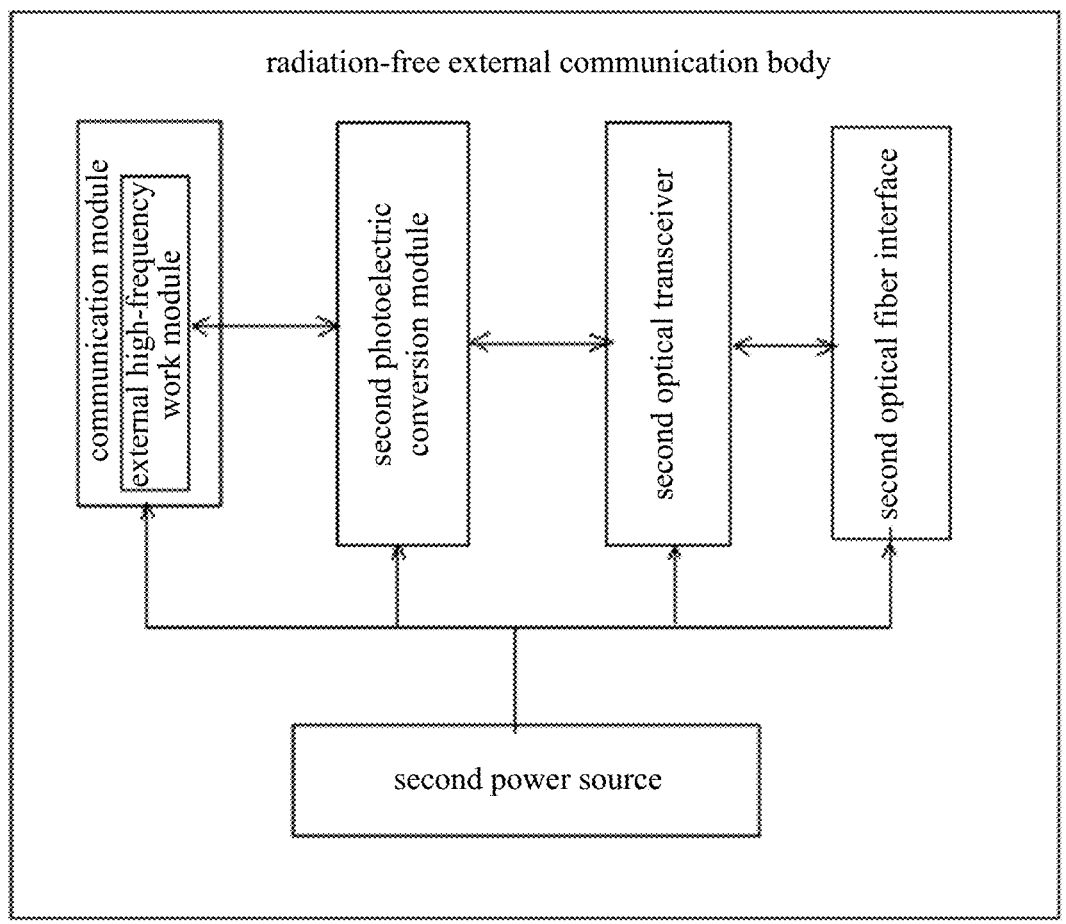
FIG. 1 is a schematic view of embodiment 1 of the present invention.

What needs to be pointed out is that embodiments and characteristics in embodiments in the following description can be combined without conflictions.

For a better understanding of the technical issue to be settled by the present invention as well as technical solutions and beneficial effects of the present invention, certain embodiments of the present invention are detailed below with reference to the accompanying drawings.

Infrared data association, called IrDA for short, of mobile phones adopts wavelengths from 850 nm to 900 nm. Short-distance wireless communications based on wireless data transmission between digital devices, such as mobile phones and computers, has nowadays been replaced by Bluetooth and WIFI, which realize wireless data reception and transmission through inter-conversion between data electric pulses and infrared optical pulses. The 4M-rate FIR technique capable of achieving small-angle (a taper angle smaller than 30°), short-distance and point-to-point linear data transmission via wireless transmission interfaces has been widely used. The 16M-rate VFIR technique has been issued (serving as a remote control to realize data communication and replaced by Bluetooth and WIFI expect for special application).

Bluetooth is a short-distance radio communication technique (generally with 10 m) for wireless information exchange between mobile phones, PDAs, wireless earphones, laptop computers and the like, has the standard of IEEE802.15, and adopts the FH (Frequency Hopping) technique and the TDMA (Time Division Multi-access) technique for wireless connection. The highest data transmission rate reaches 1 Mb/s (the effective transmission rate is 721 kb/s), and Bluetooth supports speeches and data transmission. The work frequency of transceivers is 2.45 GHz and can cover 79 channels spaced from one another by 1 MHz (from 2.402 GHz to 2.480 GHz). Short packets and the frequency hopping spread spectrum technique are adopted for data transmission, the rate reaches 1600 times per second, one packet is transmitted every time, the packet size is from 126 to 287 bit. The packets contain data or speeches. Asynchronous connection allows a data transmission rate of 721 kb/s in one direction and is used for uploading or downloading. WIFI is similar to Bluetooth, but is greater in wireless transmission distance, bandwidth and radiation.

Network cards used for laptop computers include SIM cards, Ethernet ports, WIFI and the like, which replaced traditional methods for laptop computers to have access to the Internet, such as through mobile phones via data lines, IrDA, WIFI and Bluetooth. Power is supplied to the network card through USB interfaces or external power sources.

Based on the field intensity distribution principle of electric fields and magnetic fields and the theory that the radiation intensity is inverse proportional to the square of distance, the approach to avoid radiation is to increase the distance between the microwave part of mobile terminals, such as mobile phones, intercoms and tablet computers, and the heads to over 0.3 m. In this way, the problem of SAR radiation of earphones/microphones to human bodies when people watch videos through mobile terminals (such as mobile phones and tablet computers) can also be solved.

The present invention provides a SAR radiation-free mobile terminal, which can reduce the SAR value of microwave electromagnetic radiation to the head and ears to human body to about 0 mW/kg from the maximum SAR value of 1.6 to 2.0 W/kg (the SAR value of mobile phones is a variable within a certain range according to the signal intensity of base stations) and also solves the shielding problem of microwave communication caused by the clearance zone of 5G, 6G and 7G mobile phones, the death grip and metal shells.

In this application, the part in information interaction with humans is defined as a mobile terminal body, and the part in speech information interaction with communication base stations is defined as an external communication body.

Embodiment 1

Embodiment 1 of the present invention provides a SAR radiation-free external communication body. As shown in FIG. 1, the SAR radiation-free external communication body comprises the following.

A communication module, wherein the communication module comprises an external high-frequency work module being connected with a communication base station, speech electrical signals are bidirectionally transmitted between the external high-frequency work module and the communication base station, while a normal microwave radiation power is still adopted between the external high-frequency work module and the communication base station. In this embodiment, microwaves transmitted from the external high-frequency work module to a mobile terminal body are isolated by optical fibers, so that harm to human bodies is reduced. A two-way digital circuit with a different frequency, an analog modulation/demodulation circuit with a different frequency, or the like can be set as needed.

A second photoelectric conversion module, wherein the second photoelectric conversion module is electrically connected with the communication module and is used to convert electric signals transmitted from the communication module into optical signals to be transmitted or to convert received optical signals into electric signals capable of being received by the communication module.

A second optical transceiver, wherein the second optical transceiver is connected with the second photoelectric conversion module and is used to receive or transmit optical signals. In this embodiment, the second optical transceiver is a second optical transmission-reception transistor. The appropriate type of the second optical transmission-reception transistor can be selected according to requirements of laser, infrared light, visible light and the like. The frequency and frequency hopping condition of the second optical transmission-reception transistor can also be selected as needed. Laser tubes, infrared light-emitting diodes, LEDs, semiconductor photodiodes, phototriodes, photomultiplier tubes, photocells, laser/infrared/LED photosensitive tubes and the like can be selectively used as needed. The second optical transmission-reception transistors are formed by pair transistors encapsulated together or as separated vertical transistors.

A second optical fiber interface, wherein one end of the second optical fiber interface is connected with the second optical transmission-reception transistor, and the other end of the second optical fiber interface is connected with one end of an optical fiber. The second optical fiber interface may have one or more functions, such as the function of an audio interface, the function of a Bluetooth interface and the function of a WIFI interface. Information received and transmitted via the Bluetooth interface, the WIFI interface and the second optical fiber interface is speech and data information. Information received and transmitted via the audio interface is speech information. These interfaces can be integrated into one interface or can be independently distributed.

A second power source, wherein the second power source is connected with the communication module, the second photoelectric conversion module, the second optical transmission-reception transistor and the second optical fiber interface and supplies power to communication module, the second photoelectric conversion module, the second optical transmission-reception transistor and the second optical fiber interface. The SAR radiation-free communication body is further provided with a charging interface through which the second power source can be charged by an external power source.

The communication module is connected with the communication base station wirelessly or through WIFI for communication. The SAR radiation-free external communication body is disposed on computer network cards, radio frequency cards, mobile phones, computers or smart watches and is free of SAR radiation.

The optical fibers have a length equal to or more than 0.3 m, the number of the optical fibers is equal to or more than 1. The optical fibers are provided with interfaces. Single-mode and multi-mode glass optical fibers correspond to high-frequency optical fiber interfaces, such as Bluetooth interfaces, WIFI interfaces and baseband output interfaces. Transparent audio optical fibers made from plastic, nylon, polyester and the like correspond to high-frequency, intermediate-frequency and low-frequency optical fiber interfaces. The optical fibers are selected as needed in specific application.

The independent high-frequency radio-frequency part is accessible within 360° and solves the problem of the clearance zone of mobile phone antennas. 5G network cards for computers solve the problems of radio-frequency absorption by human bodies and antenna clearance zones through the same method.

Embodiment 2

Figure 2:
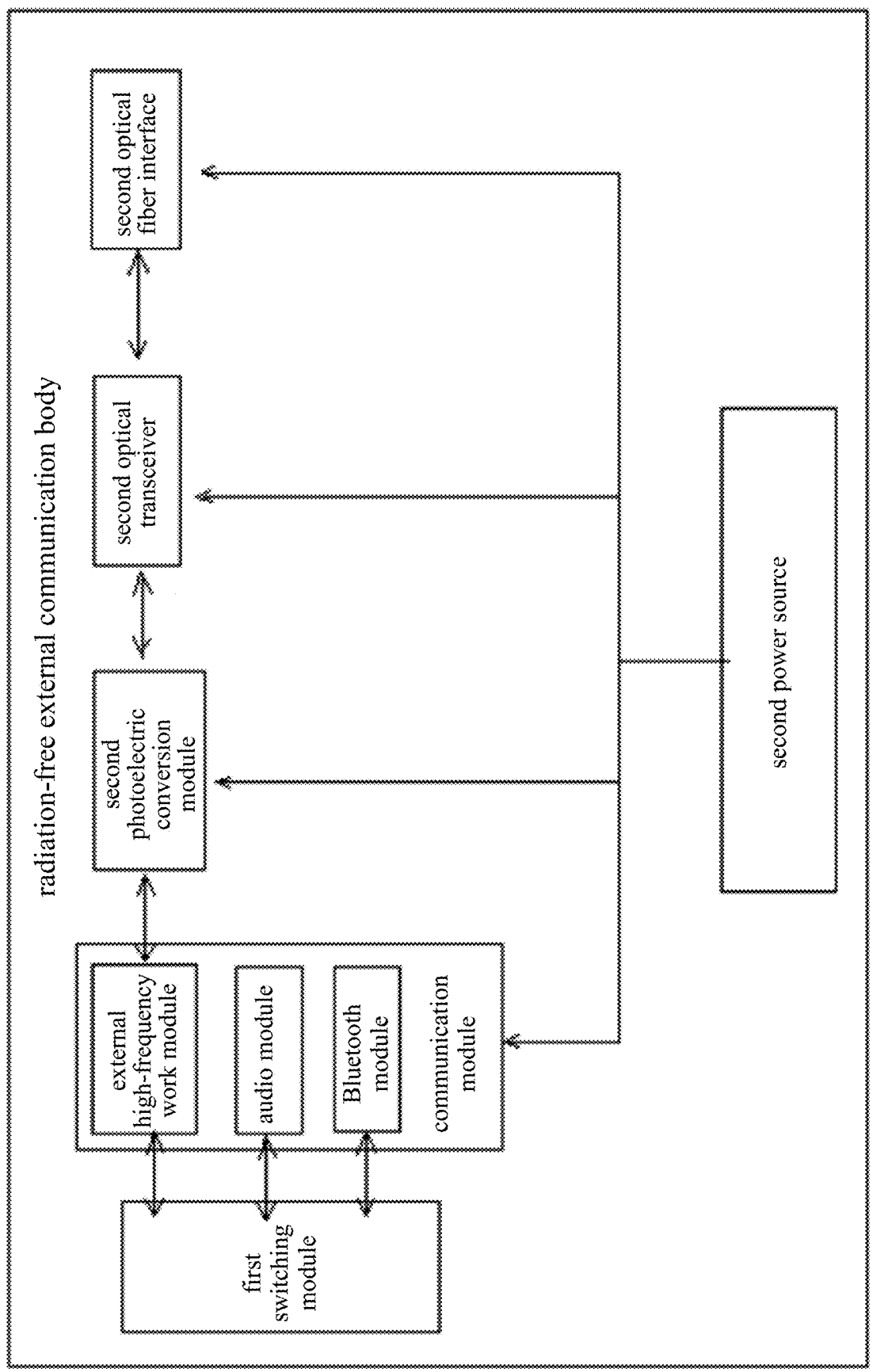
FIG. 2 is a schematic view of embodiment 2 of the present invention.

This embodiment provides a SAR radiation-free external communication body which is mostly identical with embodiment 1 in structure, and the identical parts will no longer be described herein. The difference of this embodiment from embodiment 1 is that other options for speech and data information transmission are added. As shown in FIG. 2, the communication module in this embodiment further comprises a Bluetooth module and/or audio module, wherein the Bluetooth module and/or the audio module and the external high-frequency work module are electrically connected with a second switching module. In use, when the external high-frequency work module carries out speech information interaction with the communication base station, speech information can be transmitted by converting electric signals of the speech information into optical signals by the external high-frequency work module. The second photoelectric conversion module, the second optical transmission-reception transistor and the second optical fiber interface. Or the audio module is externally connected with an audio optical fiber transceiver to carry out photoelectric conversion to achieve speech information transmission. Data information can be transmitted through photoelectric conversion by the external high-frequency work module, the second photoelectric conversion module, the second optical transmission-reception transistor and the second optical fiber interface. Or electric signals of data information are directly transmitted through Bluetooth directly by the Bluetooth module without photoelectric conversion.

Embodiment 3

Figure 3:
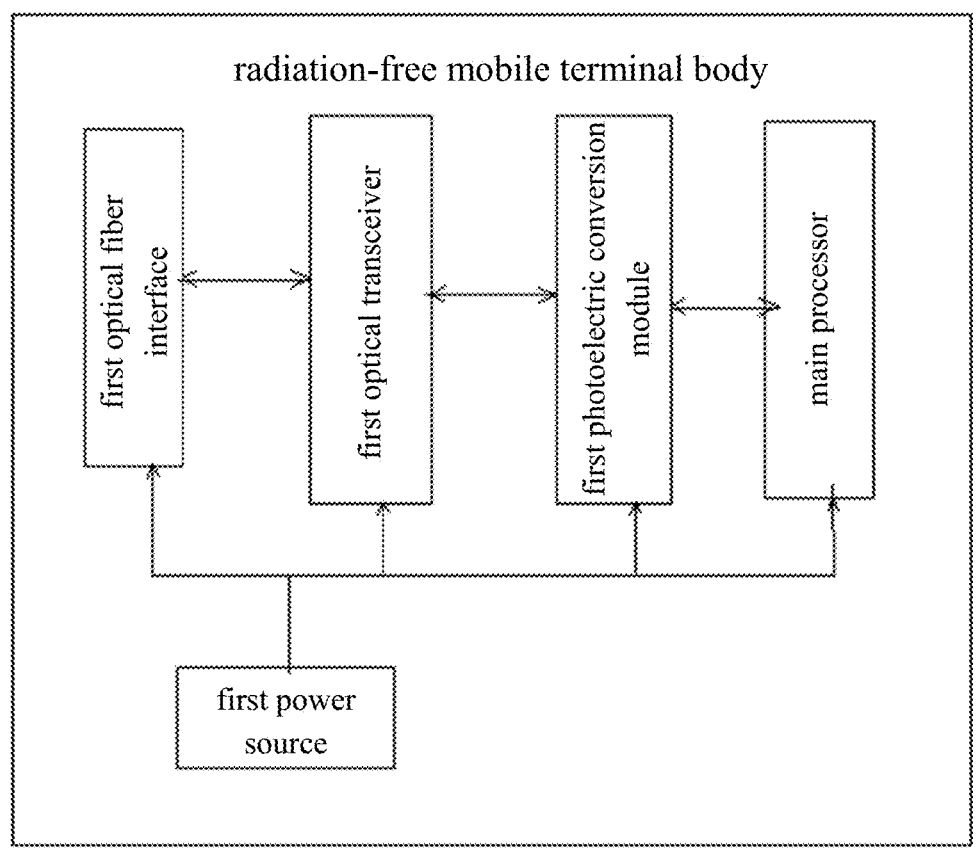
FIG. 3 is a schematic view of embodiment 3 of the present invention.

Embodiment 3 of the present invention provides a SAR radiation-free mobile terminal body, which is so design that communication circuits, antennas, coils, microwave coupling cavities of a radio-frequency part generating radiation are disposed externally, and the external communication body is connected with the mobile terminal body through optical fibers. The mobile terminal body carries out information interaction with human bodies. The external communication body carries out information interaction with the communication base station. The SAR radiation-free external communication body is spaced from the human bodies by at least 0.3 m. Optical communication information is bidirectionally transmitted through the non-metallic optical fibers, microwaves are isolated through optical fiber connection. Thus, the health of the human bodies is ensured. As shown in FIG. 3, the SAR radiation-free mobile terminal body comprises a main processor, a first photoelectric conversion module, a first optical transceiver and a first optical fiber interface.

The first photoelectric conversion module is electrically connected with the main processor and is used to convert communication electric signals transmitted from the main processor into optical signals to be sent to the SAR radiation-free external communication body or to convert optical signals from the SAR radiation-free external communication body into electric signals capable of being received by the main processor.

The first optical transceiver is connected with the first photoelectric conversion module and is used to receive or transmit optical signals. In this embodiment, the first optical transceiver is a first optical transmission-reception transistor. The appropriate type of the first optical transmission-reception transistor can be selected according to requirements of laser, infrared light, visible light and the like. The frequency and frequency hopping condition of the first optical transmission-reception transistor can also be selected as needed. Laser tubes, infrared light-emitting diodes, LEDs, semiconductor photodiodes, phototriodes, photomultiplier tubes, photocells, laser/infrared/LED photosensitive tubes and the like can be selectively used as needed. The first optical transmission-reception transistors are formed by pair transistors encapsulated together or as separated vertical transistors.

The first optical fiber interface has one end connected with the first optical transmission-reception transistor and the other end connected with the optical fibers. That is to say, two ends of the optical fibers are respectively connected with the first optical fiber interface and the second optical fiber interface, and thus, information interaction between the SAR radiation-free external communication body and the SAR radiation-free mobile terminal body is achieved. The first optical fiber interface can have one or more functions, such as the function of an audio interface, the function of a Bluetooth interface and the function of a WIFI interface. Information received and transmitted via the Bluetooth interface, the WIFI interface and the first optical fiber interface is speech and data information. Information received and transmitted via the audio interface is speech information. These interfaces can be integrated into one interface or can be independently distributed.

The SAR radiation-free mobile terminal body is internally provided with a first power source, wherein the first power source is connected with the main processor, the first photoelectric conversion module, the first optical transmission-reception transistor and the first optical fiber interface, and supplies power to the main processor, the first photoelectric conversion module, the first optical transmission-reception transistor and the first optical fiber interface.

The SAR radiation-free mobile terminal body is applied to mobile phones, intercoms, tablet computers, computers, earphones, bone-conduction earphones, Bluetooth earphones, Bluetooth speakers, or smart watches, speakers and microphones with a Bluetooth function. When the SAR radiation-free mobile terminal body is applied to the bone-conduction earphones, the requirement of the deaf for phone usage can be met. Meanwhile, the harm of long-term earphone usage to common people is reduced.

Embodiment 4

Figure 4:
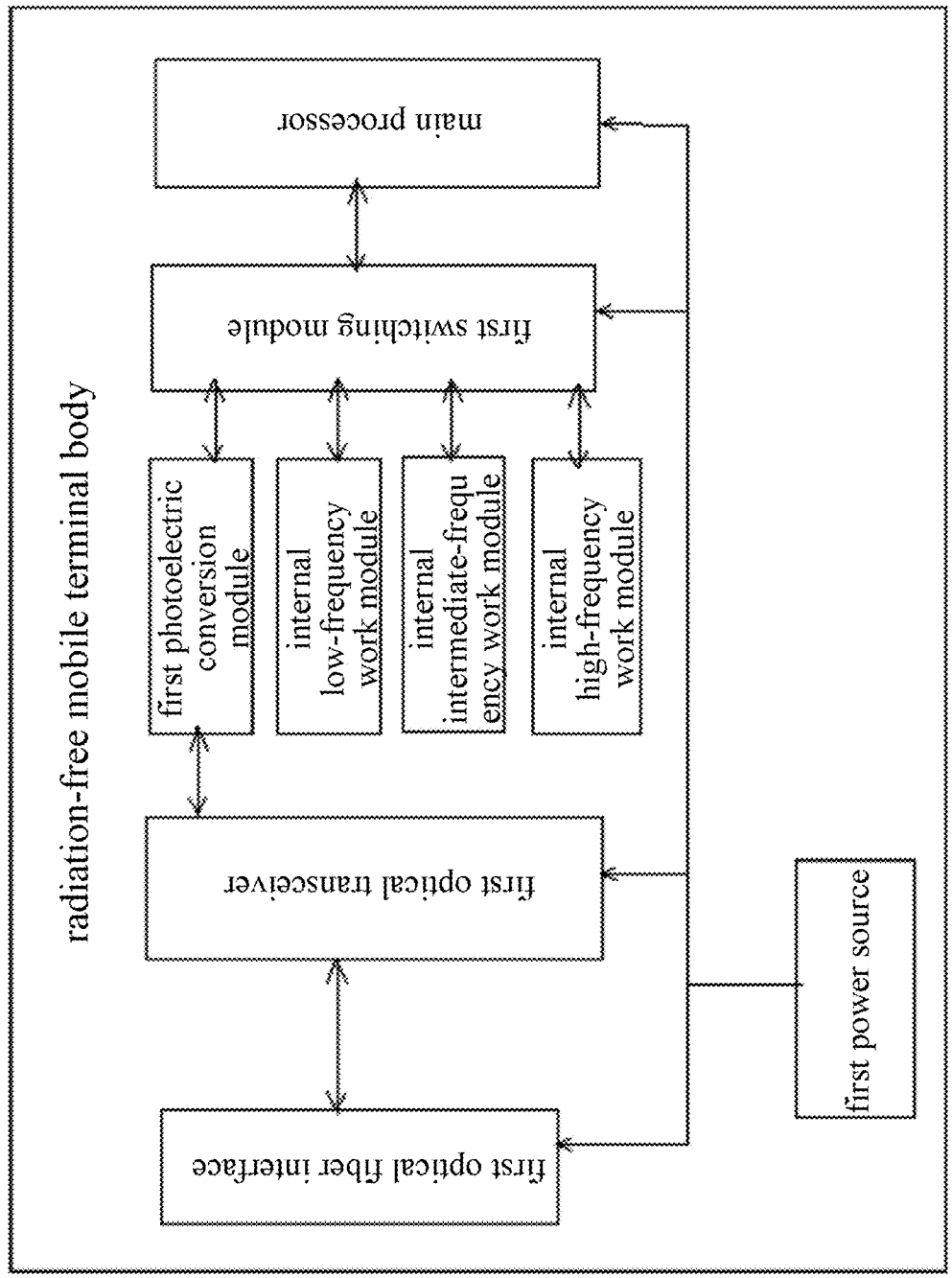
FIG. 4 is a schematic view of embodiment 4 of the present invention.

Embodiment 4 of the present invention provides a SAR radiation-free mobile terminal body. As shown in FIG. 4, the SAR radiation-free mobile terminal body comprises a main processor, a first photoelectric conversion module, a first optical transceiver, a first optical fiber interface and an internal work module.

The first photoelectric conversion module is electrically connected with the main processor and is used to convert communication electric signals transmitted from the main processor into optical signals to be sent to the SAR radiation-free external communication body or to convert optical signals from the SAR radiation-free external communication body into electric signals capable of being received by the main processor.

The first optical transceiver is connected with the first photoelectric conversion module and is used to receive and transmit optical signals. In this embodiment, the first optical transceiver is a first optical transmission-reception transistor. The appropriate type of the first optical transmission-reception transistor can be selected according to requirements of laser, infrared light, visible light and the like. The frequency and frequency hopping condition of the first optical transmission-reception transistor can also be selected as needed. Laser tubes, infrared light-emitting diodes, LEDs, semiconductor photodiodes, phototriodes, photomultiplier tubes, photocells, laser/infrared/LED photosensitive tubes and the like can be selectively used as needed. The first optical transmission-reception transistors are formed by pair transistors encapsulated together or as separated vertical transistors.

The first optical fiber interface has one end connected with the first optical transmission-reception transistor and the other end connected with the optical fibers. That is to say, two ends of the optical fibers are respectively connected with the first optical fiber interface and the second optical fiber interface, and thus, information interaction between the SAR radiation-free external communication body and the SAR radiation-free mobile terminal body is achieved. The first optical fiber interface can have one or more functions, such as the function of an audio interface, the function of a Bluetooth interface and the function of a WIFI interface. Information received and transmitted via the Bluetooth interface, the WIFI interface and the first optical fiber interface is speech and data information. Information received and transmitted via the audio interface is speech information. These interfaces can be integrated into one interface or can be independently distributed.

The internal work module comprises an internal low-frequency work module and/or an internal intermediate-frequency work module and/or an internal high-frequency work module, wherein the internal low-frequency work module and/or the internal intermediate-frequency work module and/or the internal high-frequency work module are/is disposed inside the SAR radiation-free mobile terminal body. The internal low-frequency work module and/or the internal intermediate-frequency work module and/or the internal high-frequency work module and the first photoelectric conversion module are electrically connected with one end of a first switching module, and the other end of the first switching module is electrically connected with the main processor. In this embodiment, the internal low-frequency work module is an audio module, the internal intermediate-frequency work module is a radio-frequency module, and the internal high-frequency work module is a wireless Bluetooth module. Since mobile phones are all internally provided with the audio module, the radio-frequency module and the wireless Bluetooth module, the audio module, the radio-frequency module and the wireless Bluetooth module belong to the prior art. The innovation of this embodiment is that the first switching module between all other modules and the first photoelectric conversion module is added based on the prior art, which is used to select and switch information transmission modes.

As for transmission of speech information, the internal low-frequency work module (the audio module) can be externally connected with an audio optical fiber transceiver to carry out photoelectric conversion of the speech information so as to achieve transmission of the speech information. Or the first photoelectric conversion module, the first optical transceiver and the first optical transmission-reception carry out photoelectric conversion of speech information so as to achieve transmission of the speech information. As for transmission of data information, the first photoelectric conversion module, the first optical transceiver and the first optical transmission-reception transistor carry out photoelectric transmission of the data information so as to achieve transmission of the data information, or electric signals of the data information are directly transmitted by the internal high-frequency work module (wireless Bluetooth module) based on the wireless or Bluetooth technique.

Both the internal intermediate-frequency work module (radio-frequency module) and the external communication body can carry out information interaction with the communication base station, which means that the SAR radiation-free mobile terminal body also has the function of communicating with the communication base station. When the external communication body is broken or lacks power, the radio-frequency can communicate with the communication base station for an emergency, and the specific structure of the radio-frequency module is identical with the communication structure in existing mobile phones. Except that the first switching module, the first photoelectric conversion module, the first optical transceiver and the first optical fiber interface are added, the original communication module of mobile phones and smart watches is not improved and still includes a radio-frequency circuit, an antenna, a microwave coupling cavity and the like.

The SAR radiation-free mobile terminal body is externally provided with a first power source, wherein the first power source is connected with the main processor, the internal work module, the first switching module, the first photoelectric conversion module, the first optical transceiver and the first optical fiber interface, and supplies power to the main processor, the internal work module, the first switching module, the first photoelectric conversion module, the first optical transceiver and the first optical fiber interface.

The SAR radiation-free mobile terminal body is applied to mobile phones, intercoms, tablet computers, computers, earphones, bone-conduction earphones, Bluetooth earphones, Bluetooth speakers, or smart watches, speakers and microphones with a Bluetooth function. When the SAR radiation-free mobile terminal body is applied to the bone-conduction earphones, the requirement of the deaf for phone usage can be met. Meanwhile, the harm of long-term earphone usage to common people is reduced.

When the SAR radiation-free mobile terminal body is applied to earphones, bone-conduction earphones, Bluetooth earphones, Bluetooth speakers, or smart watches with a Bluetooth function, the earphones, the Bluetooth earphones and the like can be connected with mobile phones, tablet computers and the like in use, in this case, the SAR radiation-free external communication body is disposed on devices, such as mobile phones and computers. That is to say, the mobile phones and computers are used normally and keep normally communicating with the communication base station, but communication audio information (speech information) between the mobile phones and the earphones is partially transmitted into human ears in the form of optical signals, and the audio information is subjected to optical/electric or electric/optical conversion. As human bodies are kept a certain distance away from the mobile phones when people obtain data information, such as messages, data information transmission do little harm to human bodies. Data information can still be transmitted through an original electric signal transmission mode or can be transmitted through photoelectric conversion by an optical fiber system.

Embodiment 5

Figure 5:
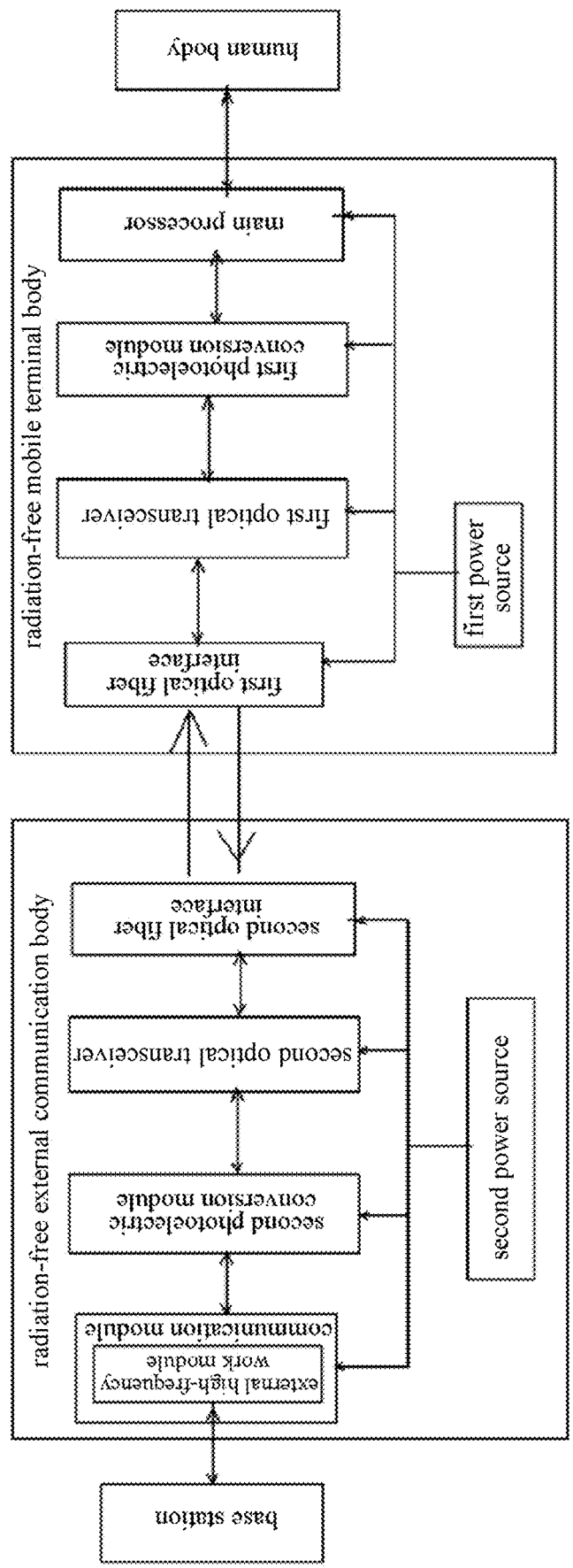
FIG. 5 is a schematic view of embodiment 5 of the present invention.

Embodiment 5 of the present invention provides a SAR radiation-free mobile terminal. As shown in FIG. 5, the SAR radiation-free mobile terminal comprises a SAR radiation-free mobile terminal body and a SAR radiation-free external communication body, wherein the SAR radiation-free external communication body is disposed outside the SAR radiation-free mobile terminal body, and the SAR radiation-free mobile terminal body and the SAR radiation-free external communication body are connected through optical fibers with a length equal to or more than 0.3 m.

The SAR radiation-free external communication body comprises the following.

A communication module, wherein the communication module comprises an external high-frequency work module connected with a communication base station, speech electrical signals are bidirectionally transmitted between the external high-frequency work module and the communication base station, and a normal microwave radiation power is still adopted between the external high-frequency work module and the communication base station. In this embodiment, microwaves transmitted from the external high-frequency work module to a mobile terminal body are isolated by optical fibers, so that harm to human bodies is reduced. A two-way digital circuit with a different frequency, an analog modulation/demodulation circuit with a different frequency, or the like can be set as needed.

A second photoelectric conversion module wherein the second photoelectric conversion module is electrically connected with the communication module and is used to convert electric signals transmitted from the communication module into optical signals to be sent or to convert received optical signals into electric signals capable of being received by the communication module.

A second optical transceiver, wherein the second optical transceiver is connected with the second photoelectric conversion module and is used to receive or transmit optical signals. In this embodiment, the second optical transceiver is a second optical transmission-reception transistor. The appropriate type of the second optical transmission-reception transistor can be selected according to the laser requirements, infrared light, visible light and the like. The frequency and frequency hopping condition of the second optical transmission-reception transistor can also be selected as needed. Laser tubes, infrared light-emitting diodes, LEDs, semiconductor photodiodes, phototriodes, photomultiplier tubes, photocells, laser/infrared/LED photosensitive tubes and the like can be selectively used as needed. The second optical transmission-reception transistor are formed by pair transistors encapsulated together or as separated vertical transistors.

A second optical fiber interface, wherein one end of the second optical fiber interface is connected with the second optical transmission-reception transistor, and the other end of the second optical fiber interface is connected with the optical fibers. The second optical fiber interface can have one or more functions, such as the function of an audio interface, the function of a Bluetooth interface and the function of a WIFI interface. Information received and transmitted via the Bluetooth interface, the WIFI interface and the second optical fiber interface is speech and data information. Information received and transmitted by the audio interface is speech information. All these interfaces can be integrated into one interface or can be independently distributed.

A second power source, wherein the second power source is connected with the communication module, the second photoelectric conversion module, the second optical transmission-reception transistor and the second optical fiber interface and supplies power to the communication module, the second photoelectric conversion module, the second optical transmission-reception transistor and the second optical fiber interface. The SAR radiation-free external communication body is further provided with a charging interface through which the second power source can be charged by an external power source.

The communication module is connected with the communication base station wirelessly or through WIFI for communication. The SAR radiation-free external communication body is disposed on computer network cards, radio frequency cards, mobile phones, computers or smart watches and is free of SAR radiation.

The optical fibers have a length equal to or more than 0.3 m. The number of the optical fibers is equal to or more than 1. The optical fibers are provided with interfaces. Single-mode and multi-mode glass optical fibers correspond to high-frequency optical fiber interfaces, such as Bluetooth interfaces, WIFI interfaces and baseband output interfaces. Transparent audio optical fibers made from plastic, nylon, polyester and the like correspond to high-frequency, intermediate-frequency and low-frequency optical fiber interfaces. The optical fibers are selected as needed in specific applications.

The SAR radiation-free mobile terminal body comprises a main processor, a first photoelectric conversion module, a first optical transceiver and a first optical fiber interface.

The first photoelectric conversion module is electrically connected with the main processor and is used to convert communication electric signals transmitted from the main processor into optical signals to be sent to the SAR radiation-free external communication body or to convert optical signals from the SAR radiation-free external communication body into electric signals capable of being received by the main processor.

The first optical transceiver is connected with the first photoelectric conversion module and is used to receive or transmit optical signals. In this embodiment, the first optical transceiver is a first optical transmission-reception transistor. The appropriate type of the first optical transmission-reception transistor can be selected according to the laser requirements, infrared light, visible light and the like. The frequency and frequency hopping condition of the first optical transmission-reception transistor can also be selected as needed. Laser tubes, infrared light-emitting diodes, LEDs, semiconductor photodiodes, phototriodes, photomultiplier tubes, photocells, laser/infrared/LED photosensitive tubes and the like can be selectively used as needed. The first optical transmission-reception transistors are formed by pair transistors encapsulated together or as separated vertical transistors.

The first optical fiber interface has one end connected with the first optical transmission-reception transistor and the other end connected with the optical fibers. That is to say, two ends of the optical fibers are respectively connected with the first optical fiber interface and the second optical fiber interface, and thus, information interaction between the SAR radiation-free external communication body and the SAR radiation-free mobile terminal body is achieved. The first optical fiber interface can have one or more functions, such as the function of an audio interface, the function of a Bluetooth interface and the function of a WIFI interface. Information received and transmitted via the Bluetooth interface, the WIFI interface and the first optical fiber interface is speech and data information. Information received and transmitted via the audio interface is speech information. These interfaces can be integrated into one interface or can be independently distributed.

The SAR radiation-free mobile terminal body is internally provided with a first power source, wherein the first power source is connected with the main processor, the first photoelectric conversion module, the first optical transmission-reception transistor and the first optical fiber interface, and supplies power to the main processor, the first photoelectric conversion module, the first optical transmission-reception transistor and the first optical fiber interface.

The SAR radiation-free mobile terminal body is applied to mobile phones, intercoms, tablet computers, computers, earphones, bone-conduction earphones, Bluetooth earphones, Bluetooth speakers, or smart watches, speakers and microphones with a Bluetooth function. When the SAR radiation-free mobile terminal body is applied to the bone-conduction earphones, the requirements of the deaf for phone usage can be met. Meanwhile, the harm of long-term earphone usage to common people is reduced.

When the mobile terminal body is applied to speakers, Bluetooth earphones and Bluetooth speakers and the external communication body is applied to mobile phones, smart watches and tablet computers, the mobile phones, the smart watches and the tablet computers are connected with the speakers, Bluetooth earphones and Bluetooth speakers provided with optical fiber interfaces via optical fibers, the earphones and the speakers carry out information interaction with human bodies, while the mobile phones and the computers interact with the communication base station. Thus, the earphones, the Bluetooth speakers and the Bluetooth earphones fulfill the function of the SAR radiation-free mobile terminal body and have the necessary characteristics of the SAR radiation-free mobile terminal body, while the mobile phones and computers fulfill the function of the SAR radiation-free external communication body and have the necessary characteristics of the SAR radiation-free external communication body.

When the mobile terminal body is applied to mobile phones, intercoms and tablet computers and the external communication body is applied to wireless network cards and radio-frequency cards, the mobile phones and intercoms are connected with the wireless network cards and the radio-frequency cards provided with optical fiber interfaces via optical fibers, the mobile phones and the computers carry out information interaction with human bodies, while the wireless network cards and radio-frequency cards interact with the communication base stations. The mobile phones and intercoms have the necessary characteristics of the SAR radiation-free mobile terminal body, while the wireless network cards and the radio-frequency cards have the necessary characteristics of the SAR radiation-free external communication body.

Embodiment 6

Figure 6:
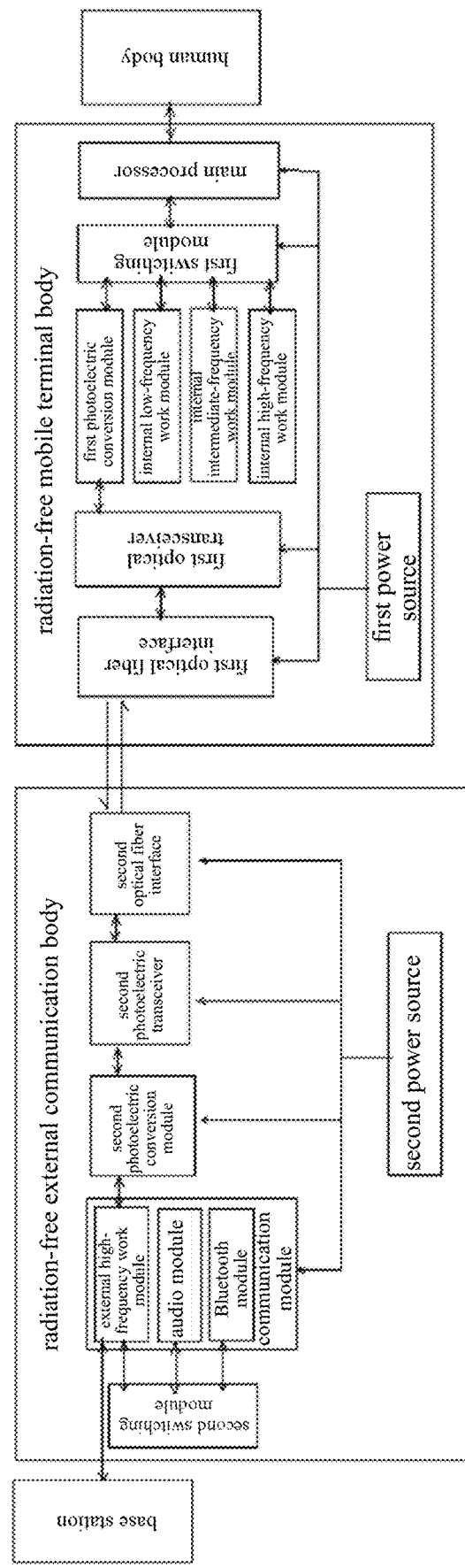
FIG. 6 is a schematic view of embodiment 6 of the present invention.

Embodiment 6 of the present invention provides a SAR radiation-free mobile terminal. As shown in FIG. 6, the SAR radiation-free mobile terminal comprises a SAR radiation-free mobile terminal body and a SAR radiation-free external communication body, wherein the SAR radiation-free external communication body is disposed outside the SAR radiation-free mobile terminal body, and the SAR radiation-free mobile terminal body and the SAR radiation-free external communication body are connected through optical fibers with a length equal to or more than 0.3 m.

The SAR radiation-free external communication body comprises the following.

A communication module, wherein the communication module comprises an external high-frequency work module connected with a communication base station, speech electrical signals are bidirectionally transmitted between the external high-frequency work module and the communication base station, and a normal microwave radiation power is still adopted between the external high-frequency work module and the communication base station. In this embodiment, microwaves transmitted from the external high-frequency work module to a mobile terminal body are isolated by optical fibers, so that harm to human bodies is reduced. A two-way digital circuit with a different frequency, an analog modulation/demodulation circuit with a different frequency, or the like can be set as needed.

The communication module further comprises a Bluetooth module and/or audio module, wherein the Bluetooth module and/or audio module and the external high-frequency work module are electrically connected with a second switching module. When in use, when the external high-frequency work module carries out speech information interaction with the communication base station, speech information can be transmitted by converting electric signals of the speech information into optical signals by the external high-frequency work module, the second photoelectric conversion module, the second optical transmission-reception transistor and the second optical fiber interface. Or the audio module is externally connected with an audio optical fiber transceiver to carry out photoelectric conversion to achieve speech information transmission. Data information can be transmitted through photoelectric conversion by the external high-frequency work module, the second photoelectric conversion module, the second optical transmission-reception transistor and the second optical fiber interface, or electric signals of data information are directly transmitted through Bluetooth directly by the Bluetooth module without photoelectric conversion.

A second photoelectric conversion module, wherein the second photoelectric conversion module is electrically connected with the communication module and is used to convert electric signals transmitted from the communication modules into optical signals to be sent or to convert received optical signals into electric signals capable of being received by the communication module.

A second optical transceiver, wherein the second optical transceiver is connected with the second photoelectric conversion module and is used to receive or transmit optical signals. In this embodiment, the second optical transceiver is a second optical transmission-reception transistor. The appropriate type of the second optical transmission-reception transistor can be selected according to the laser requirements, infrared light, visible light and the like. The frequency and frequency hopping condition of the second optical transmission-reception transistor can also be selected as needed. Laser tubes, infrared light-emitting diodes, LEDs, semiconductor photodiodes, phototriodes, photomultiplier tubes, photocells, laser/infrared/LED photosensitive tubes and the like can be selectively used as needed. The second optical transmission-reception transistors are formed by pair transistors encapsulated together or as separated vertical transistors.

A second optical fiber interface, wherein one end of the second optical fiber interface is connected with the second optical transmission-reception transistor, and the other end of the second optical fiber interface is connected with the optical fibers. The second optical fiber interface can have one or more functions, such as the function of an audio interface, the function of a Bluetooth interface and the function of a WIFI interface. Information received and transmitted via the Bluetooth interface, the WIFI interface and the second optical fiber interface is speech and data information. Information received and transmitted by the audio interface is speech information. All these interfaces can be integrated into one interface or can be independently distributed.

A second power source, wherein the second power source is connected with the communication module, the second photoelectric conversion module, the second optical transmission-reception transistor and the second optical fiber interface, and supplies power to the communication module, the second photoelectric conversion module, the second optical transmission-reception transistor and the second optical fiber interface. The SAR radiation-free external communication body is further provided with a charging interface through which the second power source can be charged by an external power source.

The communication module is connected with the communication base station wirelessly or through WIFI for communication. The SAR radiation-free external communication body is disposed on computer network cards, radio frequency cards, mobile phones, computers or smart watches and is free of SAR radiation.

The optical fibers have a length equal to or more than 0.3 m. The number of the optical fibers is equal to or more than 1. The optical fibers are provided with interfaces. Single-mode and multi-mode glass optical fibers correspond to high-frequency optical fiber interfaces, such as Bluetooth interfaces, WIFI interfaces and baseband output interfaces. Transparent audio optical fibers made from plastic, nylon, polyester and the like correspond to high-frequency, intermediate-frequency and low-frequency optical fiber interfaces. The optical fibers are selected as needed in specific applications.

The SAR radiation-free mobile terminal body comprises a main processor, a first photoelectric conversion module, a first optical transceiver, a first optical fiber interface and an internal work module.

The first photoelectric conversion module is electrically connected with the main processor and is used to convert communication electric signals transmitted from the main process into optical signals to be sent to the SAR radiation-free external communication body or to convert optical signals from the SAR radiation-free external communication body into electric signals capable of being received by the main processor.

The first optical transceiver is connected with the first photoelectric conversion module and is used to receive or transmit optical signals. In this embodiment, the first optical transceiver is a first optical transmission-reception transistor. The appropriate type of the first optical transmission-reception transistor can be selected according to requirements of laser, infrared light, visible light and the like. The frequency and frequency hopping condition of the first optical transmission-reception transistor can also be selected as needed. Laser tubes, infrared light-emitting diodes, LEDs, semiconductor photodiodes, phototriodes, photomultiplier tubes, photocells, laser/infrared/LED photosensitive tubes and the like can be selectively used as needed. The first optical transmission-reception transistors are formed by pair transistors encapsulated together or as separated vertical transistors.

The first optical fiber interface has one end connected with the first optical transmission-reception transistor and the other end connected with the optical fibers. That is to say, two ends of the optical fibers are respectively connected with the first optical fiber interface and the second optical fiber interface. Thus, information interaction between the SAR radiation-free external communication body and the SAR radiation-free mobile terminal body is achieved. The first optical fiber interface can have one or more functions, such as the function of an audio interface, the function of a Bluetooth interface and the function of a WIFI interface. Information received and transmitted via the Bluetooth interface, the WIFI interface and the first optical fiber interface is speech and data information. Information received and transmitted via the audio interface is speech information. These interfaces can be integrated into one interface or can be independently distributed.

The internal work module comprises an internal low-frequency work module and/or an internal intermediate-frequency work module and/or an internal high-frequency work module, wherein the internal low-frequency work module and/or the internal intermediate-frequency work module and/or the internal high-frequency work module are/is disposed inside the SAR radiation-free mobile terminal body. The internal low-frequency work module and/or the internal intermediate-frequency work module and/or the internal high-frequency work module and the first photoelectric conversion module are electrically connected with one end of a first switching module, and the other end of the first switching module is electrically connected with the main processor. In this embodiment, the internal low-frequency work module is an audio module, the internal intermediate-frequency module is a radio-frequency module, and the internal high-frequency work module is a wireless Bluetooth module. As mobile phones are all internally provided with the audio module, the radio-frequency module and the wireless Bluetooth module, the audio module, the radio-frequency module and the wireless Bluetooth module belong to the prior art. The innovation of this embodiment is that the first switching module between all other modules and the first photoelectric conversion module is added based on the prior art and is used to select and switch information transmission modes.

As for transmission of speech information, the internal low-frequency work module (audio module) can be externally connected with an audio optical fiber transceiver to carry out photoelectric conversion of the speech information so as to achieve transmission of the speech information, or the first photoelectric conversion module, the first optical transceiver and the first optical transmission-reception transistor carry out photoelectric conversion of speech information to achieve transmission of the speech information. As for the transmission of data information, the first photoelectric conversion module, the first optical transceiver and the first optical transmission-reception transistor carry out photoelectric transmission of the data information to achieve transmission of the data information. Or electric signals of the data information are directly transmitted by the internal high-frequency work module (wireless Bluetooth module) based on the wireless or Bluetooth technique.

Both the internal intermediate-frequency work module (radio-frequency module) and the external communication body can carry out information interaction with the communication base station, which means that the SAR radiation-free mobile terminal body also has the function of communicating with the communication base station. When the external communication body is broken or lacks power, the radio-frequency can communicate with the communication base station for an emergency, therefore the specific structure of the radio-frequency module is identical with the communication structure in existing mobile phones. Which is that the original communication module of mobile phones and smart watches is not improved and still includes a radio-frequency circuit, an antenna, a microwave coupling cavity and the like, except that the first switching module, the first photoelectric conversion module, the first optical transceiver and the first optical fiber interface are added.

The SAR radiation-free mobile terminal body is internally provided with a first power source, wherein the first power source is connected with the main processor, the internal work module, the first switching module, the first photoelectric conversion module, the first optical transceiver and the first optical fiber interface, and supplies power to the main processor, the internal work module, the first switching module, the first photoelectric conversion module, the first optical transceiver and the first optical fiber interface.

The SAR radiation-free mobile terminal body is applied to mobile phones, intercoms, tablet computers, computers, earphones, bone-conduction earphones, Bluetooth earphones, Bluetooth speakers, or smart watches, speakers and microphones with a Bluetooth function. When the SAR radiation-free mobile terminal body is applied to the bone-conduction earphones, the requirements of the deaf for phone usage can be met. Meanwhile, the harm of long-term earphone usage to common people is reduced.

When the SAR radiation-free mobile terminal body is applied to earphones, bone-conduction earphones, Bluetooth earphones, Bluetooth speakers, or smart watches with a Bluetooth function, the earphones, the Bluetooth earphones and the like can be connected with mobile phones, tablet computers and the like in use. In this case, the SAR radiation-free external communication body is disposed on devices, such as mobile phones and computers. That is to say, the mobile phones and computers are used normally and keep normally communicating with the communication base station, but communication audio information (speech information) between the mobile phones and the earphones is partially transmitted into human ears in the form of optical signals, and the audio information is subjected to optical/electric or electric/optical conversion. As human bodies are kept a certain distance away from the mobile phones when people obtain data information, such as messages, data information transmission do little harm to human bodies. Data information can still be transmitted through an original electric signal transmission mode or can be transmitted through photoelectric conversion by an optical fiber system.

One end, such as the end with the SAR radiation-free mobile terminal body, of the SAR radiation-free mobile terminal converts transmitted speech electric signals into optical signals through the photoelectric conversion module and the optical transmission-reception transistor, and then the optical signals are sent out through the optical fiber interface and the optical fiber. The other end, namely the end with the SAR radiation-free external communication body, of the SAR radiation-free mobile terminal receives optical signals via the optical fiber interface and the optical transmission-reception transistor, and the photoelectric conversion module converts the optical signals into electric signals to recover original communication information. Speech communications are bidirectionally transmitted. Communication information is bidirectionally transmitted through the non-metallic optical fiber. In this process, microwave radiation is isolated by the optical fiber.

The SAR radiation-free external communication body can be specifically configured as follows. (1) The external communication body is disposed on a radio-frequency card. As the electromagnetic radiation is mainly generated by operation of a radio-frequency module the mobile terminal, the radio-frequency card with an optical fiber interface, and an antenna are independently and externally configured to separate the radio-frequency module of the communication module, such as communication circuits and antennas, coils and microwave coupling cavities of the radio-frequency part, of the mobile terminal from the mobile terminal body. The radio-frequency card is provided with a battery and a charger interface and serves as an independent radio-frequency part. When no call is made, the battery of the radio-frequency card can be charged by the battery of mobile phones via a connector and the charger interface. The external radio-frequency card is connected with the mobile terminal through an optical fiber. During a call, the mobile terminal body carries out information interaction with human bodies, the radio-frequency card carries out information interaction with a communication base station. The radio-frequency card is kept away from the human bodies by 0.3 m or more. Optical communication information is bidirectionally transmitted through the non-metallic optical fiber, and microwaves are isolated through optical fiber connection, thus, ensuring the health of human bodies. In this case, the internal radio-frequency module of mobile terminals, such as mobile phones, can be removed or reserved. When the internal radio-frequency module is reserved, the internal radio-frequency module and the radio-frequency card can be switched to work alternately.

(2) The SAR radiation-free external communication body is disposed on a computer network card to form an external network card, which is provided with an optical fiber interface, has all the characteristics of the SAR radiation-free external communication body. The SAR radiation-free external communication body is provided with the second photoelectric conversion module, the optical fiber interface, the optical transmission-reception transistor and the like. In this case, the radio-frequency module part (including the antenna) of mobile terminals, such as mobile phones, is replaced with the wireless network card (with a power source and a charging interface) provided with the optical interface, and an antenna. An internal radio-frequency module of the mobile terminals, such as mobile phones, can be removed or reserved. When the internal radio-frequency module is reserved, the internal radio-frequency module and the network card provided with the optical fiber interface can be switched to work alternately. Laptop computers additionally provided with optical fiber interfaces can be connected with the wireless network card provided with the optical fiber interface through optical fibers.

(3) The SAR radiation-free external communication body is disposed on mobile phones, computers, smart watches and the like. That is to say, the radio-frequency module of mobile terminals, such as mobile phones, are not changed, and optical fiber interfaces, photoelectric conversion modules and optical transmission-reception transistors are additionally disposed on mobile phones. The mobile terminals, such as mobile phones, interact with the communication base station by serving as the SAR radiation-free external communication body instead of interacting with human bodies. The mobile phones are connected with the mobile terminal body, such as earphones or speakers, provided with the optical fiber interface through optical fibers. The mobile terminal body, such as the earphones, carries out information interaction with human bodies.

The mobile terminal body is specifically configured as follows. (1) The SAR radiation-free mobile terminal body is disposed on a Bluetooth earphone. Particularly, the Bluetooth earphone is additionally provided with a reception/transmission optical fiber interface, an optical/electric or electric/optical conversion module, an optical transmission-reception transistor and is connected with the communication body, such as mobile phones, through optical fibers. In this case, a wireless Bluetooth module, such as a coil or an antenna, of an original Bluetooth speech device of the communication body, such as mobile phones, connected with the Bluetooth earphone can be removed. The Bluetooth earphone is connected with the communication body, such as mobile phones, through optical fibers, which means that both data communication and speech communication are transmitted through the optical fibers. Or the original wireless Bluetooth module, such as the Bluetooth coil and the Bluetooth antenna, of the mobile phones can also be reserved and works alternately together with the earphone provided with the additional optical fiber interface. That is to say, data communication is transmitted through Bluetooth or optical fibers, while speech communication is transmitted through optical fibers.

(2) The SAR radiation-free mobile terminal body is disposed on an earphone or a microphone, which is additionally provided with an optical fiber interface, a photoelectric conversion module, an optical transmission-reception transistor and the like, can receive/transmit an audio frequency or modulate/demodulate the audio frequency with a higher frequency and is also provided with a power source and a charging interface. The optical fiber interface, the photoelectric conversion module, the optical transmission-reception transistor and the like are additionally disposed at the audio interface of the communication body, such as mobile phones. Photoelectric conversion is carried out with the audio frequency, or the audio frequency is modulated/demodulated with a higher frequency. The communication body, such as mobile phones, is connected with the earphone or the microphone through optical fibers.

(3) The SAR radiation-free mobile terminal body is disposed on an earphone or microphone, wherein the earphone or the microphone is additionally provided with an optical fiber interface, a photoelectric conversion module, an optical transmission-reception transistor and the like, can receive/transmit an audio frequency or modulate/demodulate the audio frequency with a higher frequency and is provided with a power source and a charging interface. The audio output interface of the communication body, such as mobile phones, is connected with an external audio optical fiber receiver/transmitter. The audio optical fiber receiver/transmitter belongs to the prior art and is provided with an audio port, an optical fiber interface, a photoelectric conversion circuit and an optical transmission-reception transistor. The audio port is connected with the audio output interface of the communication body, such as mobile phones. The optical fiber interface is connected with the optical fiber interface of the earphone or microphone, and the optical fiber interface and an optical/electric or electric/optical conversion circuit convert speech information received/transmitted via the audio port into optical signals and then are connected with the earphone/microphone provided with the optical fiber interface through optical fibers.

(4) The SAR radiation-free mobile terminal body is disposed on an earphone or microphone, wherein the earphone or the microphone is additionally provided with an optical fiber interface, a photoelectric conversion module, an optical transmission-reception transistor and the like, can receive/transmit an audio frequency or modulate/demodulate the audio frequency with a higher frequency and is also provided with a power source and a charging interface. The audio output interface of the existing communication body, such as mobile phones, is generally a 3.5 mm earphone interface, and the 3.5 mm earphone interface can be omitted to integrate the earphone interface and a data interface. The earphone interface is connected with an audio port of an external audio optical fiber receiver/transmitter, and an optical fiber interface of the external audio optical fiber receiver/transmitter is connected with the optical fiber interface of the earphone/microphone through optical fibers.

One of the above technical solutions can be adopted, or the above technical solutions can be freely combined in use.

Figure 7:
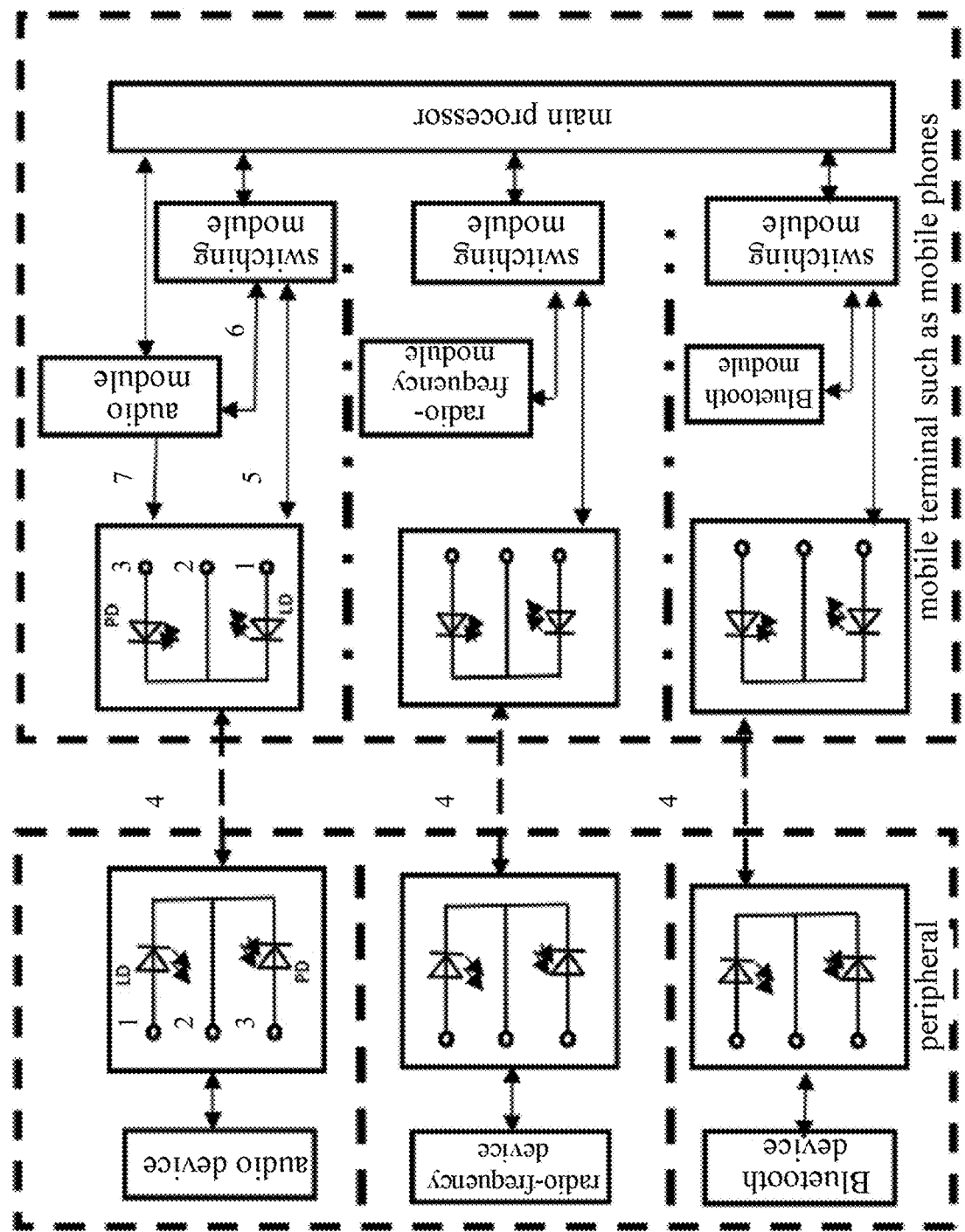
FIG. 7 is a circuit block diagram of embodiment 6 of the present invention.

FIG. 7 shows a circuit block diagram of this embodiment. In FIG. 7, 1 refers to a luminescent tube circuit diagram (LD). 2 refers to a common terminal. 3 refers to a receiving tube circuit diagram (PD). 4 refers to an optical fiber. 5 refers to an optical/electric or electric/optical port connected with an external circuit. 6 refers to a port connected with an internal circuit. 7 refers to an audio port connected with an external optical fiber receiver/transmitter. Devices, such as mobile phones and tablet computers, can be connected with an audio device, a radio-frequency device or a Bluetooth device through optical fibers, wherein the audio device can be, for instance, the earphone or microphone provided with the mobile terminal body, the radio-frequency device can be, for instance, the radio-frequency card or computer network card provided with the external communication body, and the Bluetooth device can be, for instance, the Bluetooth earphone or Bluetooth speaker provided with the mobile terminal body. When the devices, such as mobile phones and computers, are connected with the audio device and the Bluetooth device through optical fibers, the devices, such as mobile phones and computers, interact with the communication base station, the audio device and Bluetooth device interact with human bodies. The devices, such as mobile phones and computers, are equivalent to the communication body, and the audio device and the Bluetooth device are equivalent to the mobile terminal body. When the devices, such as mobile phones and computers, are connected with the radio-frequency device, the radio-frequency device is equivalent to the communication body and interacts with the communication base station, and the mobile phones or computers are equivalent to the mobile terminal body and interact with human bodies. As shown in FIG. 6, the original audio module, radio-frequency module and wireless Bluetooth module in the devices, such as mobile phones, can be reserved, and a switching module is disposed between the original audio module, radio-frequency module and wireless Bluetooth module in the devices, such as mobile phones, and the external audio device, radio-frequency device and Bluetooth device so as to achieve switching between the prior art and the mode in this application. The audio module in existing mobile phones can be connected with the external audio device by being connected with an external optical fiber receiver/transmitter.

Figure 8:
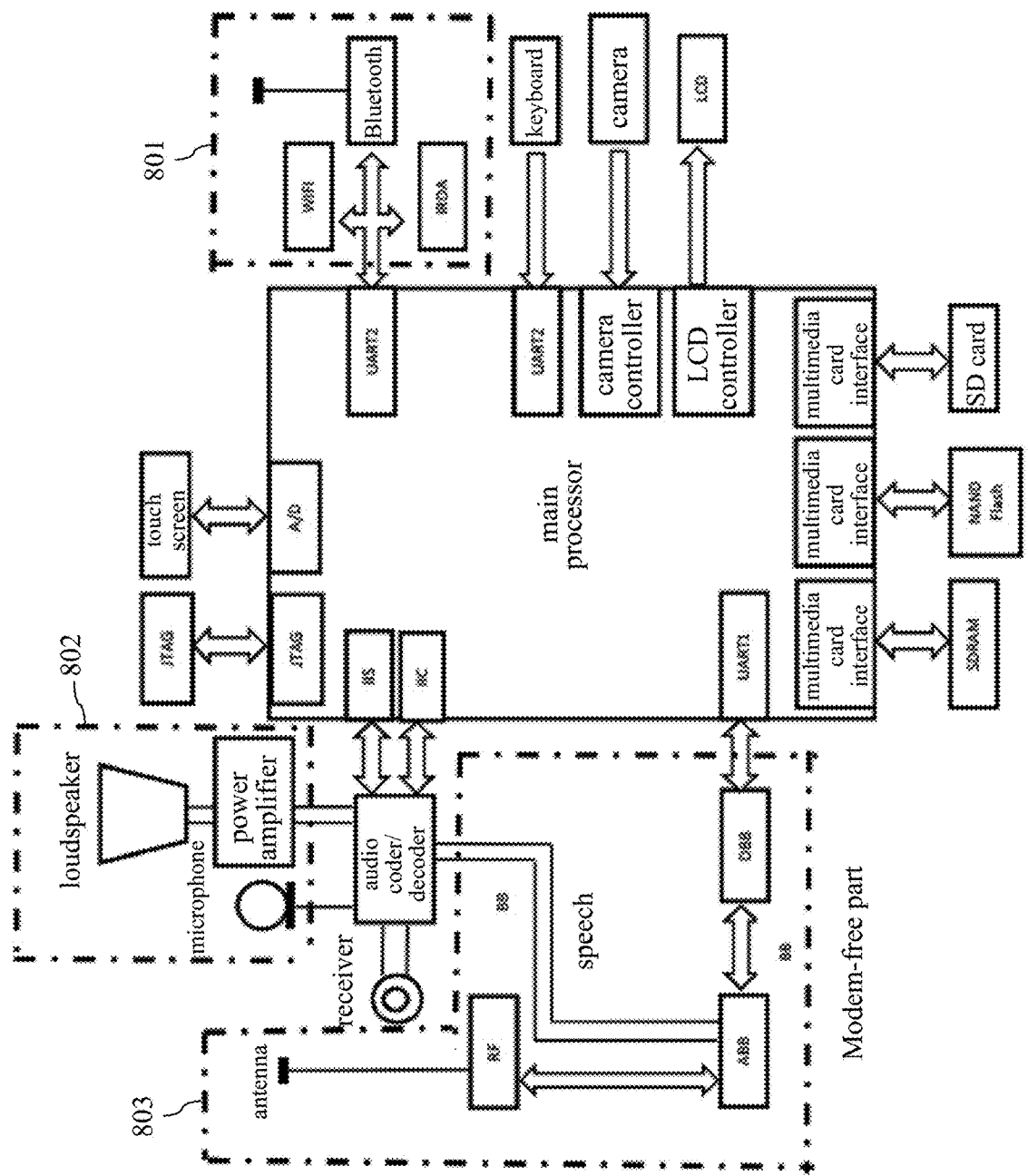
FIG. 8 is a circuit position diagram of optical fiber interfaces in embodiment 6 of the present invention.

FIG. 8 shows a circuit position diagram of optical fiber interfaces in this embodiment. In FIG. 8, 801 refers to an optical fiber interface, a photoelectric conversion circuit and an optical transmission-reception transistor disposed at a WIFI and Bluetooth port. 802 refers to an optical fiber interface, a photoelectric conversion circuit and an optical transmission-reception transistor disposed at an audio port. 803 refers to an optical fiber interface, a photoelectric conversion circuit and an optical transmission-reception transistor disposed on the radio-frequency part.

Figure 9:
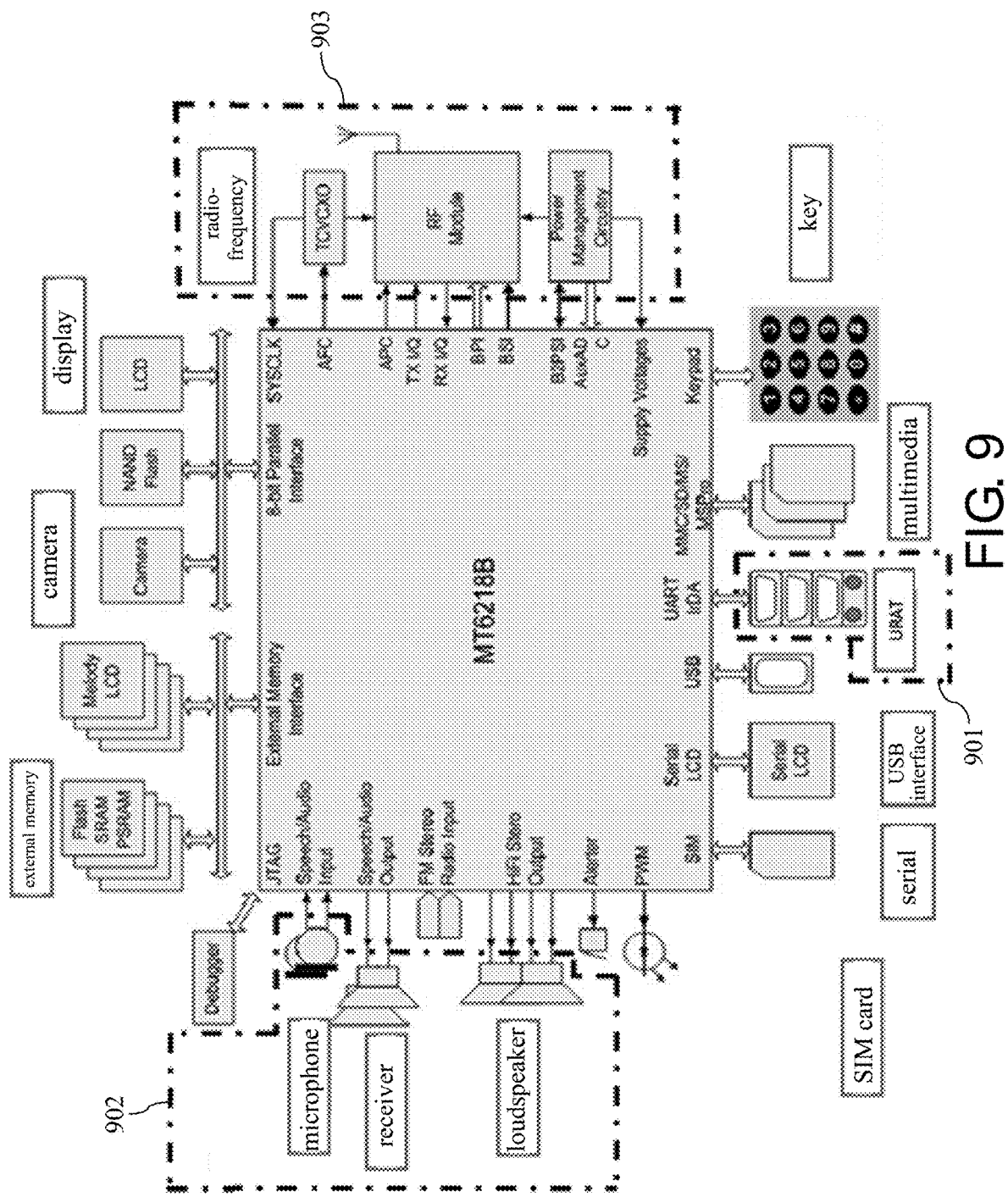
FIG. 9 is a circuit connection diagram of the optical fiber interfaces in embodiment 6 of the present invention.

FIG. 9 shows a circuit connection diagram of optical fiber interfaces in this embodiment. In FIG. 9, 901 refers to an optical fiber interface disposed at a WIFI or Bluetooth port. 902 refers to an optical fiber interface disposed at an audio port. 903 refers to an optical fiber port disposed on the radio-frequency part.

Figure 10:
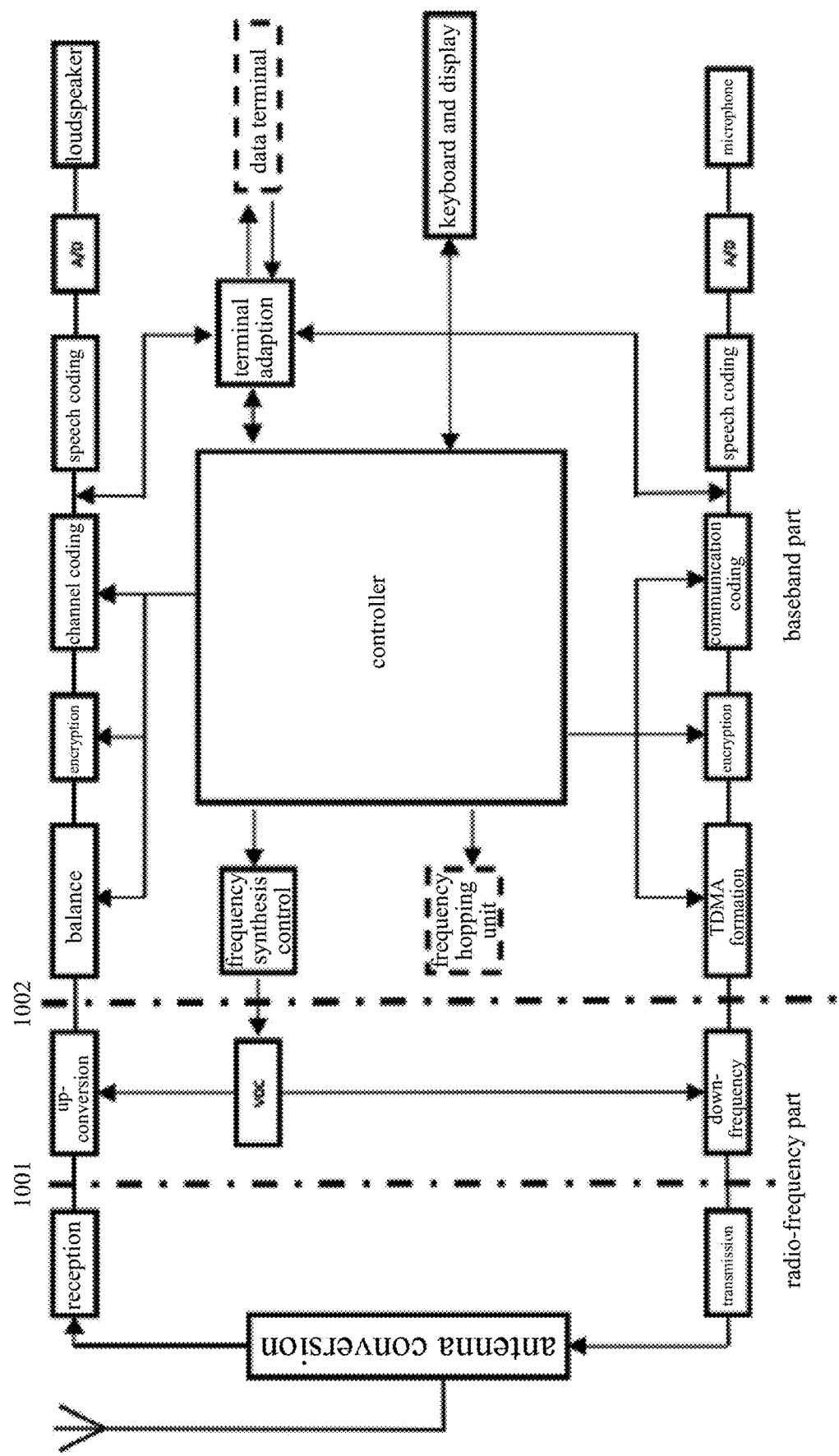
FIG. 10 is a schematic diagram of the optical fiber interfaces disposed between a radio-frequency circuit and a baseband circuit in embodiment 6 of the present invention.

FIG. 10 shows a diagram of optical fiber interfaces disposed between a radio-frequency circuit and a baseband circuit. As shown in FIG. 10, two optical fiber interfaces are disposed between reception and transmission, and two optical fiber interfaces are disposed between up-conversion and down-conversion in part 1001 and identical optical fibers can also be disposed in part 1002.

Figure 11:
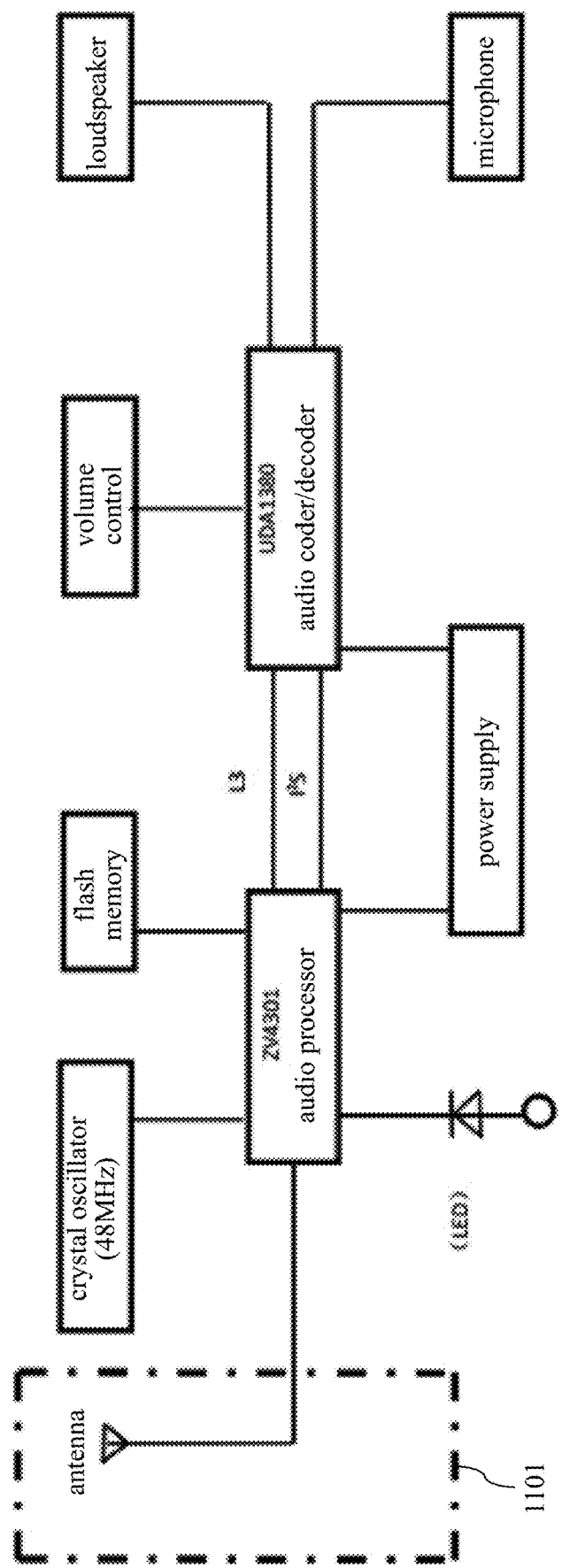
FIG. 11 is a structural block diagram of a Bluetooth earphone in embodiment 6 of the present invention.
Figure 12:
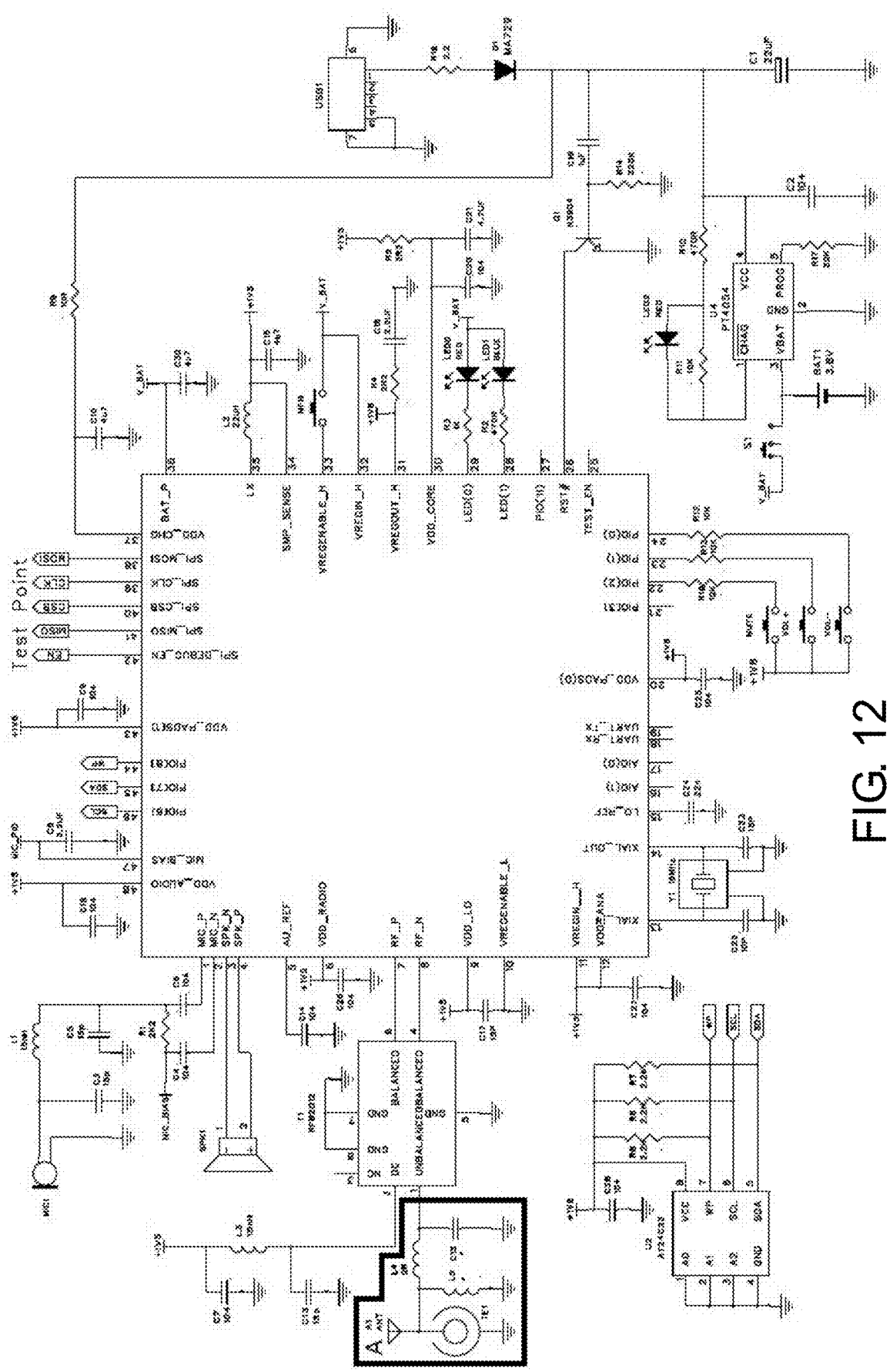
FIG. 12 is a circuit diagram of the Bluetooth earphone in embodiment 6 of the present invention.

FIG. 11 shows a structural block diagram of the Bluetooth earphone in this embodiment, wherein 1101 refers to the position of an optical fiber interface. The specific circuit diagram of the Bluetooth earphone is shown in FIG. 12, wherein A refers to the position of an optical fiber interface. All the optical fiber interfaces comprise an optical/electric or electric/optical conversion circuit, an optical transmission-reception transistor, and the like.

The operating method of the SAR radiation-free mobile terminal of the present invention is as follows.

The SAR radiation-free external communication body modulates a transmitted speech or data electric signal into an optical signal through the photoelectric conversion circuit and the optical transmission-reception transistor, such as a luminescent tube, and the optical signal is sent out via the optical fiber interface and the optical fibers. The SAR radiation-free mobile terminal body receives the speech or data optical signal via the optical fiber interface and the optical transmission-reception transistor, such as a photo-sensitive tube, the optical signal is converted into an electric signal by the photoelectric conversion circuit to receive original communication and data, and speech/data optical communication information is bidirectionally transmitted through the non-metallic optical fibers. Microwave SAR radiation is isolated by the optical fibers. The uplink and the downlink can adopt different frequencies or different frequency hopping techniques.

The SAR radiation-free external communication body is provided with the communication body capable of being connected with the communication base station without affecting the compatibility and normal radiation power of communication equipment, and inter-conversion between electric signals and optical signals is realized through a photoelectric conversion module. Signals are transmitted between the SAR radiation-free external communication body and the SAR radiation-free mobile terminal body through optical fibers mainly made from non-metallic materials, such as glass, plastic and nylon, so that conduction of microwave radiation is avoided. Thus, effectively avoiding the harm of mobile phone radiation to human bodies.

In addition, mobile phones and microphones/speakers can be set to be directional, for instance, zoom microphones/speakers (with batteries) can be adopted. A guide tube with a certain length and aperture for providing an audio angle is used to increase the distance between mobile phones and the heads of human bodies, so that disturbance can be avoided under a small included angle. The guide tube is actually used to increase the out-playing distance. Infrared interfaces, wireless network cards and infrared reception earphones/microphones (with batteries) are connected with the mobile terminal body, such as the mobile phones, through non-metallic materials. No speech is transmitted through the connection with non-metallic materials, and thus, disturbance is avoided under a small included angle. The independent radio-frequency part is accessible within 360 degrees, so that the problems of the antenna clearance zone and human body absorption and metal shielding of network cards are solved. The object of the present invention can also be fulfilled by connecting the audio interfaces of mobile phones with external optical fiber speech interfaces.

The frequency of bidirectional speech modulation/demodulation: stereophonic or multi-channel Dolby decoding is needed for single-channel and double-channel communications, listening to music, watching videos and the like. One optical fiber corresponds to a frequency of $1 \leq n \leq 7$ channel(s), or multiple optical fibers corresponds to multiple channels.

5G, 6G and 7G mobile phones involved in this present invention can be provided with metal shells, so that the problem that metal shells are inapplicable to certain mobile phones is solved. Metal or metal coatings of all microphones/earphones are shielded, so that re-induction of microwaves by devices, such as speaker coils, is avoided.

One embodiment of the present invention is detailed above, but the above contents are only used to illustrate the preferred embodiment of the present invention and is not intended to limit the implementation scope of the present invention. All equivalent modifications and improvements obtained within the application range of the present invention should fall within the patent range of the present invention.

What is claimed is:
1. A specific absorption rate (SAR) radiation-free mobile terminal body, comprising:
a main processor;
a first photoelectric conversion module being connected with the main processor and used to convert communication electric signals from the main processor into communication optical signals or to convert optical signals from an SAR radiation-free external commu- nication body into electric signals capable of being received by the main processor;

a first optical transceiver connected with the first photoelectric conversion module and used to receive or transmit the optical signals; and a first optical fiber interface having one end connected with the first optical transceiver, wherein the SAR radiation-free mobile terminal body further comprises a first switching module and an internal work module, wherein the internal work module comprises an internal low-frequency work module and/or an internal intermediate-frequency work module and/or an internal high-frequency work module, wherein the internal low-frequency work module and/or the internal intermediate-frequency work module and/or the internal high-frequency work module are/is disposed inside the SAR radiation-free mobile terminal body, wherein one end of the first switching module electrically connects with the internal low-frequency work module and/or the internal intermediate-frequency work module and/or the internal high-frequency work module and the first photoelectric conversion module, and the other end of the first switching module electrically connects with the main processor.

2. The SAR radiation-free mobile terminal body according to claim 1, wherein the SAR radiation-free mobile terminal body is applied to mobile phones, intercoms, tablet computers, computers, earphones, bone-conduction earphones, Bluetooth earphones, Bluetooth speakers or smart watches with a Bluetooth function.

3. A specific absorption rate (SAR) radiation-free external communication body based on a SAR radiation-free mobile terminal body, wherein the SAR radiation-free mobile terminal body comprises:
a main processor;
a first photoelectric conversion module being connected with the main processor and used to convert communication electric signals from the main processor into communication optical signals or to convert optical signals from the SAR radiation-free external communication body into electric signals capable of being received by the main processor;
a first optical transceiver connected with the first photoelectric conversion module and used to receive or transmit the optical signals; and
a first optical fiber interface having one end connected with the first optical transceiver,
the SAR radiation-free external communication body comprises:
a communication module, wherein the communication module comprises an external high-frequency work module connected with a communication base station, and electric signals are bidirectionally transmitted between the external high-frequency work module and the communication base station;
a second photoelectric conversion module, wherein the second photoelectric conversion module is electrically connected with the communication module and is used to convert electric signals transmitted from the communication module into optical signals to be sent to the SAR radiation-free mobile terminal body or to convert optical signals from the SAR radiation-free mobile terminal body into electric signals capable of being received by the communication module;

a second optical transceiver, wherein the second optical transceiver is connected with the second photoelectric conversion module and is used to receive or transmit the optical signals; and a second optical fiber interface, wherein one end of the second optical fiber interface is connected with the second optical transceiver and the other end of the second optical fiber interface is connected with one end of an optical fiber, and the other end of the optical fiber is connected with the other end of the first optical fiber interface.

4. The SAR radiation-free external communication body according to claim 3, wherein the communication module further comprises a Bluetooth module and/or an audio module, and the Bluetooth module and/or the audio module and the external high-frequency work module are electrically connected with a second switching module.

5. The SAR radiation-free external communication body according to claim 3, wherein the SAR radiation-free external communication body is provided with a second power source, and the second power source is connected with the communication module, the second photoelectric conversion module, the second optical transceiver and the second optical fiber interface and supplies power to the communication module, the second photoelectric conversion module, the second optical transceiver and the second optical fiber interface.

6. The SAR radiation-free external communication body according to claim 3, wherein the communication module communicates with the communication base station wirelessly or through WIFI.

7. The SAR radiation-free external communication body according to claim 3, wherein the SAR radiation-free external communication body is applied to computer network cards, radio-frequency cards, mobile phones, computers or smart watches.

8. A specific absorption rate (SAR) radiation-free mobile terminal based on a SAR radiation-free external communication body and a SAR radiation-free mobile terminal body, wherein the SAR radiation-free mobile terminal body comprises:
a main processor;
a first photoelectric conversion module being connected with the main processor and used to convert communication electric signals from the main processor into communication optical signals or to convert optical signals from the SAR radiation-free external communication body into electric signals capable of being received by the main processor;
a first optical transceiver connected with the first photoelectric conversion module and used to receive or transmit the optical signals; and
a first optical fiber interface having one end connected with the first optical transceiver,
the SAR radiation-free external communication body comprises:
a communication module, wherein the communication module comprises an external high-frequency work module connected with a communication base station, and electric signals are bidirectionally transmitted between the external high-frequency work module and the communication base station;
a second photoelectric conversion module, wherein the second photoelectric conversion module is electrically connected with the communication module and is used to convert electric signals transmitted from the communication module into optical signals to be sent to the SAR radiation-free mobile terminal body or to convert optical signals from the SAR radiation-free mobile terminal body into electric signals capable of being received by the communication module;

a second optical transceiver, wherein the second optical transceiver is connected with the second photoelectric conversion module and is used to receive or transmit the optical signals; and a second optical fiber interface, wherein one end of the second optical fiber interface is connected with the second optical transceiver and the other end of the second optical fiber interface is connected with one end of an optical fiber, and the other end of the optical fiber is connected with the other end of the first optical fiber interface, the SAR radiation-free mobile terminal comprises: the SAR radiation-free mobile terminal body and the SAR radiation-free external communication body, wherein the SAR radiation-free external communication body is disposed outside the SAR radiation-free mobile terminal body, wherein the SAR radiation-free external communication body connects with the SAR radiation-free mobile terminal body through an optical fiber.

9. The SAR radiation-free mobile terminal according to claim 8, wherein the optical fiber has a length equal to or more than 0.3 m.

* * * * *